(12) United States Patent
Xu et al.

(10) Patent No.: US 12,732,799 B2
(45) Date of Patent: Sep. 8, 2026

(54) ACCESS NETWORK DEVICE SELECTION METHOD AND APPARATUS

(71) Applicant: Huawei Technologies Co., Ltd., Shenzhen (CN)

(72) Inventors: Yishan Xu, Shanghai (CN); Kang Huang, Shenzhen (CN); Chuan Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/785,796

(22) Filed: Jul. 26, 2024

(65) Prior Publication Data

US 2024/0388896 A1 Nov. 21, 2024

Related U.S. Application Data

(63) Continuation of application No. PCT/CN2023/073424, filed on Jan. 20, 2023.

(30) Foreign Application Priority Data

Jan. 28, 2022 (CN) ........................ 202210108074.1

(51) Int. Cl.
*G06F 15/16* (2006.01)
*H04L 61/4511* (2022.01)
*H04W 8/26* (2009.01)

(52) U.S. Cl.
CPC .......... *H04W 8/26* (2013.01); *H04L 61/4511* (2022.05)

(58) Field of Classification Search
CPC ............................ H04W 8/26; H04L 61/4511
USPC ........................................................ 709/245
See application file for complete search history.

(56) References Cited

U.S. PATENT DOCUMENTS

| | | | | |
|---|---|---|---|---|
| 2023/0021642 A1* | 1/2023 | Grayson | H04W 8/26 |
| 2023/0252324 A1* | 8/2023 | Matlick | H04L 61/5007 706/12 |
| 2024/0172095 A1* | 5/2024 | Lindheimer | H04W 8/02 |
| 2024/0196222 A1* | 6/2024 | Kim | H04W 12/08 |
| 2024/0276359 A1* | 8/2024 | Lindheimer | H04W 48/12 |

FOREIGN PATENT DOCUMENTS

| | | | |
|---|---|---|---|
| CN | 113810897 | A | 12/2021 |
| CN | 113965334 | A | 1/2022 |
| WO | 2012071701 | A1 | 6/2012 |
| WO | 2018176442 | A1 | 10/2018 |

* cited by examiner

*Primary Examiner* — Alan S Chou
(74) *Attorney, Agent, or Firm* — Slater Matsil, LLP

(57) ABSTRACT

This application provides an access network device selection method and an apparatus. In the method, the terminal device may indicate, to a DNS through one or more of first indication information, second indication information, and at least one GIN, whether the terminal device needs to support external authentication. Therefore, when selecting the non-3GPP access network device for the terminal device, the DNS may consider one or more of the first indication information, the second indication information, and the at least one GIN, to select the proper non-3GPP access network device for the terminal device based on the indication of the terminal device. For example, when the terminal device supports external authentication or needs to support external authentication, the DNS may select, for the terminal device, a non-3GPP access network device capable of performing external authentication.

20 Claims, 8 Drawing Sheets

ACCESS NETWORK DEVICE SELECTION METHOD AND APPARATUS

CROSS-REFERENCE TO RELATED APPLICATIONS

This application is a continuation of International Application No. PCT/CN2023/073424, filed on Jan. 20, 2023, which claims priority to Chinese Patent Application No. 202210108074.1, filed on Jan. 28, 2022. The disclosures of the aforementioned applications are hereby incorporated by reference in their entireties.

TECHNICAL FIELD

This application relates to the field of wireless communication technologies, and in particular, to an access network device selection method and an apparatus.

BACKGROUND

A non-public network is a network that is different from a public network and provides a service for a specific user. When a terminal device wants to obtain access to a service of the non-public network, the terminal device may register with the non-public network, to obtain access to the related service.

Currently, the terminal device may access the non-public network through a non-3$^{rd}$ generation partnership project (3GPP) access network device. In a conventional technology, the terminal device may access the non-public network to obtain access to the service of the non-public network. Because different non-3GPP access network devices support different capabilities, a proper non-3GPP access network device needs to be selected for the terminal device to access the non-public network via a non-3GPP access type, and in this way, the terminal device accesses the non-public network through the non-3GPP access network device.

Therefore, how to select the proper non-3GPP access network device for the terminal device becomes a technical problem to be resolved.

SUMMARY

This application provides an access network device selection method and an apparatus, to select a proper non-3GPP access network device for a terminal device.

According to a first aspect, an access network device selection method is provided. The method may be performed by a terminal device or a chip with similar functions of a terminal device. In the method, the terminal device sends a query message to a domain name server (DNS). The query message includes one or more of the following: first indication information, second indication information, and at least one group identifier for network selection (GIN). The first indication information indicates onboarding, and the second indication information indicates external authentication. The at least one GIN is an identifier of a group to which one or more default credentials servers (DCS) or credentials holders (CH) belong. The query message is used to request to obtain a non-3GPP access network device identifier, and a non-3GPP access network device corresponding to the non-3GPP access network device identifier is located in a first non-public network. The terminal device receives a query response from the DNS, where the query response includes the non-3GPP access network device identifier.

Based on the foregoing solution, the terminal device may indicate, to the DNS through one or more of the first indication information, the second indication information, and the at least one GIN, whether the terminal device needs to support external authentication. Therefore, when selecting the non-3GPP access network device for the terminal device, the DNS may consider one or more of the first indication information, the second indication information, and the at least one GIN, to select the proper non-3GPP access network device for the terminal device based on the indication of the terminal device. For example, when the terminal device supports external authentication or needs to support external authentication, the DNS may select, for the terminal device, a non-3GPP access network device capable of performing external authentication. In this way, the DNS can support the terminal device in accessing a non-public network through a non-3GPP access network.

In a possible case, the first indication information indicates onboarding. For example, the terminal device needs to access the non-public network to perform onboarding. In another possible case, the first indication information indicates whether the terminal device supports onboarding. In still another possible case, the first indication information may indicate whether the non-3GPP access network device or a non-public network in which the non-3GPP access network device is located supports onboarding or needs to support onboarding.

In a possible case, the second indication information indicates external authentication. For example, the terminal device needs to access the non-public network to perform external authentication. In another possible case, the second indication information indicates whether the terminal device supports external authentication. In still another possible case, the second indication information may indicate whether the non-3GPP access network device or a non-public network in which the non-3GPP access network device is located supports external authentication or needs to support external authentication.

For example, it is assumed that a first message includes the first indication information and the second indication information. For example, the first message includes onboarding 1 and external authentication 1. Onboarding 1 indicates that onboarding is supported, and external authentication 1 indicates that external authentication is supported. In this case, it may be considered that the terminal device supports both onboarding and external authentication, or the non-3GPP access network device supports both onboarding and external authentication, or the non-public network in which the non-3GPP access network device is located supports both onboarding and external authentication.

In an example, the GIN may be the identifier of the group to which the one or more default credentials servers or credentials holders belong. Each GIN may indicate that external authentication is supported or may indicate onboarding. For example, when one GIN indicates that external authentication is supported, the one or more default credentials servers or credentials holders included in the group corresponding to the GIN support external authentication. For another example, when one GIN indicates onboarding, the one or more default credentials servers or credentials holders included in the group corresponding to the GIN support onboarding.

In a possible implementation, the query message further includes a non-public network identifier, and the first non-public network is a non-public network corresponding to the non-public network identifier.

Based on the foregoing solution, the terminal device may indicate the non-public network identifier to the DNS, so that the DNS can select, based on the indication of the terminal device, the proper non-3GPP access network device from the non-public network corresponding to the non-public network identifier.

In a possible implementation, the query message further includes domain name information, and one or more of the first indication information, the second indication information, and the at least one GIN are included in the domain name information.

Based on the foregoing solution, a structure of the domain name information may be adjusted. The domain name information may include one or more of the first indication information, the second indication information, and the at least one GIN, to indicate an authentication manner supported by the terminal device, so that the DNS can select the proper non-3GPP access network device through the domain name information when selecting the non-3GPP access network device for the terminal device.

In a possible implementation, when the query message includes the at least one GIN, the first non-public network supports connecting to a default credentials server or a credentials holder corresponding to the at least one GIN to perform onboarding, or the first non-public network supports connecting to a default credentials server or a credentials holder corresponding to the at least one GIN to perform external authentication.

For example, it is assumed that the first message includes a GIN 1 and a GIN 2. The GIN 1 indicates that onboarding is supported or identifies a group that supports onboarding, the GIN 2 indicates that external authentication is supported or identifies a group that supports external authentication, and the first message further includes a non-public network identifier 1. In this case, a non-public network (referred to as a first non-public network) corresponding to the non-public network identifier 1 may support connecting to a default credentials server or a credentials holder included in a group corresponding to the GIN 1 to perform onboarding.

Based on the foregoing solution, the first non-public network is connected to the default credentials server or the credentials holder to perform onboarding or external authentication, to implement authentication on the terminal device, so that the terminal device can access the non-public network, to obtain access to a service of the non-public network.

In a possible implementation, the non-3GPP access network device supports onboarding or external authentication. For example, when the terminal device supports onboarding or needs to support onboarding, the non-3GPP access network device supports onboarding. When the terminal device supports external authentication or needs to support external authentication, the non-3GPP access network device supports external authentication.

Based on the foregoing solution, the non-3GPP access network device determined by the DNS for the terminal device may support onboarding or external authentication. For example, when the terminal device supports onboarding, the non-3GPP access network device may support onboarding. When the terminal device supports external authentication, the non-3GPP access network device may support external authentication. In this way, authentication on the terminal device is implemented, and the terminal device can access the non-public network.

In a possible implementation, the terminal device sends first information to the non-3GPP access network device, where the first information indicates onboarding or external authentication.

Based on the foregoing solution, the terminal device indicates onboarding or external authentication to the non-3GPP access network device, so that the non-3GPP access network device can select a proper core network device, for example, an AMF, to provide an access service for the terminal device, so that the terminal device can access the non-public network.

In a possible implementation, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

According to a second aspect, an access network device selection method is provided. The method may be performed by a DNS or a chip with similar functions of a DNS. In the method, the DNS receives a query message from a terminal device, where the query message includes one or more of the following: first indication information, second indication information, and at least one GIN. The first indication information indicates onboarding, and the second indication information indicates external authentication. The at least one GIN is an identifier of a group to which one or more default credentials servers or credentials holders belong. The query message is used to request to obtain a non-3GPP access network device identifier, and a non-3GPP access network device corresponding to the non-3GPP access network device identifier is located in a first non-public network. The DNS sends a query response to the terminal device, where the query response includes the non-3GPP access network device identifier. The non-3GPP access network device identifier is determined based on the query message.

In a possible implementation, the query message further includes a non-public network identifier, and the first non-public network is a non-public network corresponding to the non-public network identifier.

In a possible implementation, the query message further includes domain name information, and one or more of the first indication information, the second indication information, and the at least one GIN are included in the domain name information.

In a possible implementation, when the query message includes the at least one GIN, the first non-public network supports connecting to a default credentials server or a credentials holder corresponding to the at least one GIN to perform onboarding, or the first non-public network supports connecting to a default credentials server or a credentials holder corresponding to the at least one GIN to perform external authentication.

In a possible implementation, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

According to a third aspect, an access network device selection method is provided. The method may be performed by a terminal device or a chip with similar functions of a terminal device. In the method, the terminal device determines a non-public network identifier based on configuration information. The configuration information indicates a non-public network that supports onboarding or a non-public network that supports external authentication. The terminal device sends a query message to a DNS, where the query message includes the non-public network identifier. The terminal device receives a query response from the DNS, where the query response includes a non-3GPP access network device identifier, and a non-3GPP access network device corresponding to the non-3GPP access network device identifier is located in a non-public network corresponding to the non-public network identifier.

Based on the foregoing solution, the terminal device may select, through the configuration information, a non-public network identifier from non-public network identifiers that support onboarding or external authentication. Therefore, the terminal device may indicate a subscription manner to the DNS through the non-public network identifier. In this way, the DNS may select, through the non-public network identifier, one non-3GPP access network device from non-3GPP access network devices included in a non-public network corresponding to the non-public network identifier.

In an example, the configuration information may include at least one of a non-public network identifier that supports onboarding and a non-public network identifier that supports external authentication. There may be one or more non-public network identifiers that support onboarding. In other words, the configuration information may include one or more non-public network identifiers that support onboarding. Similarly, there may be one or more non-public network identifiers that support external authentication. In other words, the configuration information may include one or more non-public network identifiers that support external authentication.

It may be understood that, if the configuration information does not include the non-public network identifier that supports onboarding, it may be considered that the terminal device does not support onboarding, or it is considered that there is no non-public network that supports onboarding, or it is considered that there is no non-public network in which the non-3GPP access network device is deployed and onboarding is supported. If the configuration information does not include the non-public network identifier that supports external authentication, it may be considered that the terminal device does not support external authentication, or it is considered that there is no non-public network that supports external authentication, or it is considered that there is no non-public network in which the non-3GPP access network device is deployed and external authentication is supported.

In a possible implementation, the configuration information indicates that all non-3GPP access network devices in the non-public network that supports onboarding support onboarding, and/or the configuration information indicates that all non-3GPP access network devices in the non-public network that supports external authentication support external authentication.

Based on the foregoing solution, when all the non-3GPP access network devices in the non-public network that supports onboarding support onboarding, and the configuration information indicates that all the non-3GPP access network devices in the non-public network that supports external authentication support external authentication, the DNS may select any non-3GPP access network device in the non-public network indicated by the terminal device. An authentication manner supported by the non-3GPP access network device selected by the DNS is the same as an authentication manner supported by the terminal device. Therefore, the terminal device may access the non-public network through the non-3GPP access network device selected by the DNS.

In a possible implementation, the terminal device sends first information to the non-3GPP access network device, where the first information indicates onboarding or external authentication.

Based on the foregoing solution, the terminal device indicates onboarding or external authentication to the non-3GPP access network device, so that the non-3GPP access network device can select a proper core network device, for example, an AMF, to provide an access service for the terminal device, so that the terminal device can access the non-public network.

In a possible implementation, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

According to a fourth aspect, an access network device selection method is provided. The method may be performed by a non-3GPP access network device or a chip with similar functions of a non-3GPP access network device. In the method, the non-3GPP access network device receives first information from a terminal device, where the first information indicates onboarding or external authentication. The non-3GPP access network device selects, based on the first information, a mobility management device that supports onboarding or external authentication.

Based on the foregoing solution, the terminal device indicates onboarding or external authentication to the non-3GPP access network device, so that the non-3GPP access network device can select a proper core network device, for example, an AMF, to provide an access service for the terminal device, so that the terminal device can access the non-public network.

In a possible implementation, the non-3GPP access network device is an untrusted non-3GPP access network device or a non-3GPP interworking function.

Based on the foregoing solution, the terminal device may access the non-public network through the untrusted non-3GPP access network device or the non-3GPP interworking function, to obtain access to a service of the non-public network.

According to a fifth aspect, an access network device selection method is provided. The method may be performed by a terminal device or a chip with similar functions of a terminal device. In the method, the terminal device obtains one or more identifiers of at least one non-public network. The terminal device determines an identifier of a first non-public network from the identifiers of the at least one non-public network based on configuration information. The configuration information indicates a non-public network that supports onboarding or a non-public network that supports external authentication. The terminal device sets up a connection to a trusted non-3GPP access network device, where the trusted non-3GPP access network device is located in the first non-public network.

Based on the foregoing solution, the terminal device may determine the identifier of the first non-public network through the configuration information and the obtained identifiers of the at least one non-public network. In this way, an authentication manner indicated by the non-public network is an authentication manner supported by the terminal device. Therefore, the identifier of the first non-public network sent by the terminal device to the trusted non-3GPP access network device indicates, to the trusted non-3GPP access network device, the authentication manner supported by the terminal device, so that the trusted non-3GPP access network device selects a proper mobility management device to perform access management on the terminal device.

In a possible implementation, the terminal device receives one or more of first indication information, second indication information, and at least one GIN. The first indication information indicates that the at least one non-public network supports onboarding. The second indication information indicates that the at least one non-public network supports external authentication. The at least one GIN is an identifier of a group to which one or more default credentials servers or credentials holders belong.

Based on the foregoing solution, the terminal device may also indicate the supported authentication manner to the trusted non-3GPP access network device through one or more of the first indication information, the second indication information, and the at least one GIN, so that the non-3GPP access network device can select the proper mobility management device to perform access management on the terminal device.

In a possible implementation, the terminal device obtains the one or more identifiers of the at least one non-public network from a broadcast message.

In an example, the broadcast message may include the first indication information and the identifier of the one or more non-public networks. It may be understood as that, the one or more non-public networks support onboarding. In a possible case, the broadcast message may include a network list. For example, the network list may include the identifier of the one or more non-public networks that support onboarding, and the first indication information may be a name of the network list. Each non-public network in the network list indicates a non-public network to which the trusted non-3GPP access network device supports connecting.

In still another example, the broadcast message may include the second indication information and the identifier of the one or more non-public networks. In this case, it may be understood as that, the one or more non-public networks support external authentication. In a possible case, the broadcast message may include the network list. For example, the network list may include the identifier of the one or more non-public networks that support external authentication, and the second indication information may be a name of the network list. Each non-public network in the network list indicates a non-public network to which the trusted non-3GPP access network device supports connecting.

In yet another example, the broadcast message may include at least one GIN that supports onboarding, which indicates one or more non-public networks to which the trusted non-3GPP access network device may be connected, and supports connecting to a default credentials server or a credentials holder included in the at least one GIN to perform onboarding. For another example, the broadcast message may include at least one GIN that supports external authentication, which indicates one or more non-public networks to which the trusted non-3GPP access network device may be connected, and supports connecting to a default credentials server or a credentials holder included in the at least one GIN to perform external authentication.

According to a sixth aspect, an access network device selection method is provided. The method may be performed by a trusted non-3GPP access network device or a chip with similar functions of a trusted non-3GPP access network device. In the method, the trusted non-3GPP access network device sends one or more identifiers of at least one non-public network. The trusted non-3GPP access network device sets up a connection to a terminal device. The trusted non-3GPP access network device receives a registration request message from the terminal device. The registration request message includes an identifier of a first non-public network. The identifier of the first non-public network is one of the identifiers of the at least one non-public network. The trusted non-3GPP access network device sends the registration request message to a mobility management device. The mobility management device is configured to perform access management on the terminal device, and the mobility management device is determined based on the identifier of the first non-public network.

In a possible implementation, the trusted non-3GPP access network device receives first information from the terminal device, where the first information indicates onboarding or external authentication. The trusted non-3GPP access network device selects a mobility management device that supports onboarding or external authentication. The trusted non-3GPP access network device sends the registration request message to the mobility management device.

In a possible implementation, the trusted non-3GPP access network device sends one or more of first indication information, second indication information, and at least one GIN. The first indication information indicates that the at least one non-public network supports onboarding. The second indication information indicates that the at least one non-public network supports external authentication. The at least one GIN is an identifier of a group to which one or more default credentials servers or credentials holders belong.

In a possible implementation, the trusted non-3GPP access network device sends a broadcast message, where the broadcast message includes the one or more identifiers of the at least one non-public network.

In a possible implementation, the first indication information or the second indication information is a name of a network list.

In a possible implementation, the first indication information is a name of a first network list, and the second indication information is a name of a second network list. The first network list includes an identifier of at least one second non-public network, and the at least one second non-public network supports onboarding. The second network list includes an identifier of at least one third non-public network, the at least one third non-public network supports external authentication, and the identifiers of the at least one non-public network include the identifier of the at least one second non-public network and/or the identifier of the at least one third non-public network.

Based on the foregoing solution, the trusted non-3GPP access network device may broadcast, in the broadcast message, a non-public network identifier that supports onboarding and a non-public network identifier that supports external authentication, so that the terminal device can select one non-public network identifier from the broadcast non-public network identifiers, to determine an authentication manner supported by the terminal device. Therefore, a proper mobility management device can be selected for the terminal device.

According to a seventh aspect, an access network device selection method is provided. The method may be performed by a mobility management device or a chip with similar functions of a mobility management device. In the method, the mobility management device receives second information from a terminal device, where the second information indicates an access technology type of the terminal device, and the mobility management device is located in a non-public network. The mobility management device determines at least one of data network name information and network slice information based on the access technology type, where a network slice corresponding to the network slice information is a network slice available for the terminal device to use, and a data network corresponding to the data network name information is a data network available for the terminal device to connect.

Based on the foregoing solution, the terminal device may perform a non-public network service through at least one of the network slice information and the data network name information that are determined by the mobility management device. Because the network slice information and the data network name information are selected by the mobility management device based on the access technology type of the terminal device, different network slice information and different data network name information may be selected based on the access technology type of the terminal device. Therefore, differentiated transmission can be implemented for the terminal device.

In a possible implementation, the mobility management device receives third information from the terminal device, where the third information indicates onboarding. The mobility management device rejects access of the terminal device when the access technology type indicates that the terminal device accesses the non-public network through a public network.

According to an eighth aspect, an embodiment of this application provides a communication apparatus. The apparatus may be a terminal device, or may be a chip used in a terminal device. The apparatus has a function of implementing any implementation method of the first aspect. The function may be implemented by hardware, or may be implemented by hardware executing corresponding software. The hardware or the software includes one or more modules corresponding to the function.

According to a ninth aspect, an embodiment of this application provides a communication apparatus. The apparatus may be a DNS, or may be a chip or a module used in a DNS. The apparatus has a function of implementing any implementation method of the second aspect. The function may be implemented by hardware, or may be implemented by hardware executing corresponding software. The hardware or the software includes one or more modules corresponding to the function.

According to a tenth aspect, an embodiment of this application provides a communication apparatus. The apparatus may be a terminal device or a chip or a module used in the terminal device. The apparatus has a function of implementing any implementation method of the third aspect. The function may be implemented by hardware, or may be implemented by hardware executing corresponding software. The hardware or the software includes one or more modules corresponding to the function.

According to an eleventh aspect, an embodiment of this application provides a communication apparatus. The apparatus may be a non-3GPP access network device or a chip or a module used in the non-3GPP access network device. The apparatus has a function of implementing any implementation method of the fourth aspect. The function may be implemented by hardware, or may be implemented by hardware executing corresponding software. The hardware or the software includes one or more modules corresponding to the function.

According to a twelfth aspect, an embodiment of this application provides a communication apparatus. The apparatus may be a terminal device or a chip or a module used in the terminal device. The apparatus has a function of implementing any implementation method of the fifth aspect. The function may be implemented by hardware, or may be implemented by hardware executing corresponding software. The hardware or the software includes one or more modules corresponding to the function.

According to a thirteenth aspect, an embodiment of this application provides a communication apparatus. The apparatus may be a trusted non-3GPP access network device or a chip or a module used in the trusted non-3GPP access network device. The apparatus has a function of implementing any implementation method of the sixth aspect. The function may be implemented by hardware, or may be implemented by hardware executing corresponding software. The hardware or the software includes one or more modules corresponding to the function.

According to a fourteenth aspect, an embodiment of this application provides a communication apparatus. The apparatus may be a mobility management device or a chip or a module used in the mobility management device. The apparatus has a function of implementing any implementation method of the seventh aspect. The function may be implemented by hardware, or may be implemented by hardware executing corresponding software. The hardware or the software includes one or more modules corresponding to the function.

According to a fifteenth aspect, an embodiment of this application provides a communication apparatus, including a processor and a memory. The memory is configured to store computer instructions. When the apparatus runs, the processor executes the computer instructions stored in the memory, to enable the apparatus to perform any implementation method in the first aspect to the seventh aspect.

According to a sixteenth aspect, an embodiment of this application provides a communication apparatus, including units or means for performing steps of any implementation method in the first aspect to the seventh aspect.

According to a seventeenth aspect, an embodiment of this application provides a communication apparatus, including a processor and an interface circuit. The processor is configured to communicate with another apparatus through the interface circuit, and perform any implementation method in the first aspect to the seventh aspect. There are one or more processors.

According to an eighteenth aspect, an embodiment of this application provides a communication apparatus, including a processor coupled to a memory. The processor is configured to invoke a program stored in the memory, to perform any implementation method in the first aspect to the seventh aspect. The memory may be located inside or outside the apparatus. In addition, there may be one or more processors.

According to a nineteenth aspect, an embodiment of this application further provides a computer-readable storage medium, where the computer-readable storage medium stores instructions; and when the instructions run on a communication apparatus, any implementation method in the first aspect to the seventh aspect is performed.

According to a twentieth aspect, an embodiment of this application further provides a computer program product. The computer program product includes a computer program or instructions. When the computer program or the instructions are run by a communication apparatus, any implementation method in the first aspect to the seventh aspect is performed.

According to a twenty-first aspect, an embodiment of this application further provides a chip system, including a processor, configured to perform any implementation method in the first aspect to the seventh aspect.

According to a twenty-second aspect, an embodiment of this application further provides a communication system, including the communication apparatus according to the eighth aspect and the communication apparatus according to the ninth aspect. Optionally, the communication system further includes the communication apparatus according to the eleventh aspect. Optionally, the communication system further includes the communication apparatus according to the fourteenth aspect.

According to a twenty-third aspect, an embodiment of this application further provides a communication system, including the communication apparatus according to the twelfth aspect and the communication apparatus according to the thirteenth aspect.

DETAILED DESCRIPTION OF ILLUSTRATIVE EMBODIMENTS

Figure 1:
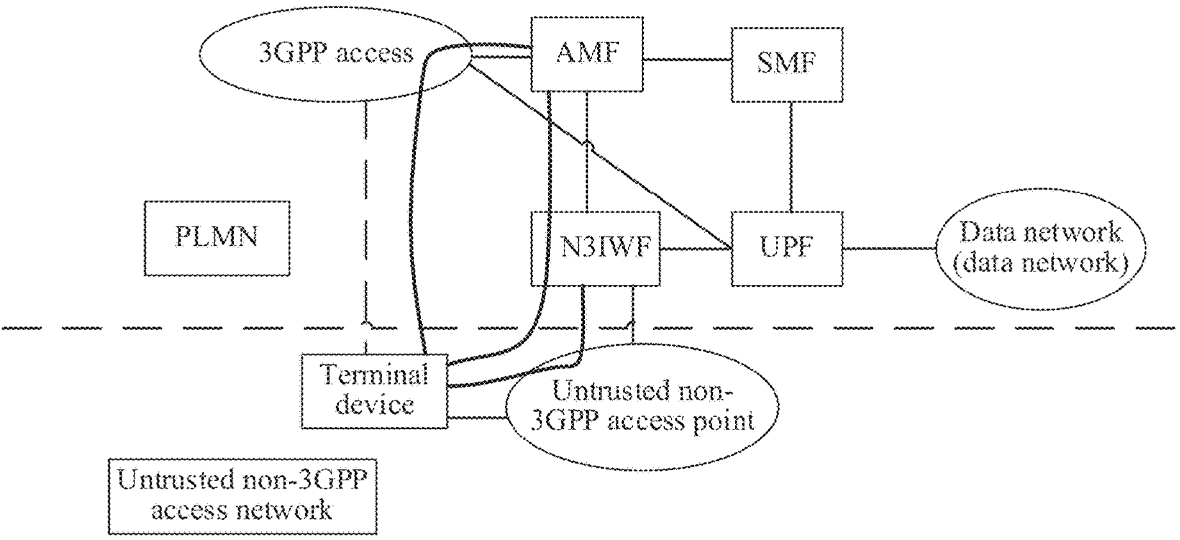
FIG. 1 is a diagram of an untrusted non-3GPP access network according to an embodiment of this application.

For ease of understanding technical solutions provided in embodiments of this application, the following explains and describes technical terms in this application.

(1) A non-public network (NPN) is a network that is different from a public network and provides a service for a specific user. Depending on whether a core network (CN) is independent, the non-public network is classified into the following two types.

Standalone NPN network (SNPN): This network does not depend on a public land mobile network (PLMN) and is operated by an SNPN operator. It may be understood as that, a core network of the SNPN is independent of the PLMN network, in other words, the core network of the SNPN is independently operated by the SNPN.

Non-standalone NPN network (a public network integrated NPN, PNI-NPN): This network depends on the PLMN network and is operated by a legacy operator. It may be understood as that, the PNI-NPN is actually the PLMN, but the PLMN provides a special slice and/or data network to provide an NPN service. In other words, not all terminal devices can obtain access to the NPN service. The terminal device can obtain access to the NPN service only after slice authentication and/or secondary authentication are/is performed. In short, the PNI-NPN isolates a public network service from a non-public network service through the slice, to provide the non-public network service for a non-public network user.

(2) For SNPN external subscription, credentials of the terminal device are owned by or belong to a credentials holder (CH), or may be understood as credentials allocated by a credentials holder. The CH is separate from an SNPN accessed by the terminal device. Therefore, in comparison with a procedure in which the terminal device accesses the SNPN, a difference lies in that primary authentication or a security procedure of the terminal device is performed in the CH instead of the SNPN. In a process in which UE accesses the SNPN, network elements that participate in the access process in the SNPN network vary depending on an architecture of the CH.

(3) A default credentials server (DCS) is an entity capable of performing authentication based on a default terminal credential or an entity that can provide a manner for another entity to perform authentication based on a default terminal credential.

(4) The credentials holder (CH) is an entity configured to authenticate and authorize a terminal to access a standalone non-public network separate from the credentials holder.

(5) SNPN onboarding means that a terminal device needs to access an onboarding network (which may be understood as a network that performs onboarding) by using default credentials, default UE credentials (default UE credentials), or PLMN credentials when the terminal device does not obtain subscription data for accessing the non-public network, for example, when the terminal device does not obtain subscription data for requesting to access the non-public network. The subscription data may include a credential used for authentication. After the terminal device successfully accesses the onboarding network, the terminal device sets up a connection to a provisioning server (PVS). The PVS provides, through onboarding network, the terminal device with the subscription data used for accessing the non-public network, for example, the credential used for authentication.

(6) A non-3GPP access type includes an untrusted non-3GPP access technology like access to a core network through a radio access node purchased by an individual, a trusted non-3GPP access technology like access to a core network through a radio access node deployed by an operator, and a wireline access technology. The non-3GPP access technology may include a technology like a wireless communication technology (Wi-Fi), Bluetooth, or ZigBee. A non-3GPP access network device may include a non-3GPP interworking function (N3IWF), a trusted non-3GPP gateway function (TNGF), a trusted non-3GPP access point (TNAP), a trusted wireless local area network interworking function (TWIF), and a wireline access gateway function (W-AGF). The W-AGF may also be referred to as an AGF. If the access technology is the untrusted non-3GPP access technology, a non-3GPP access network device corresponding to the untrusted non-3GPP access technology may include an N3IWF. A network topology of the N3IWF is equivalent to a radio access network (RAN) in a 3GPP access network, and may support an N2 interface and an N3 interface. If the access technology is the trusted non-3GPP access technology, a non-3GPP access network device corresponding to the trusted non-3GPP access technology may include a TNGF. A network topology of the TNGF is equivalent to a RAN in a 3GPP access network, and may support an N2 interface and an N3 interface.

FIG. 1 is a diagram of an untrusted non-3GPP access system according to an embodiment of this application. A terminal device first sets up a connection to an untrusted non-3GPP access point, obtains an internet protocol (IP) address, and then obtains IP identification information of an N3IWF, for example, address information, through a DNS server based on an N3IWF discovery and selection criterion. Then, the terminal device sets up an internet protocol security (IPsec) tunnel with the N3IWF, and accesses a core network through the N3IWF.

Figure 2:
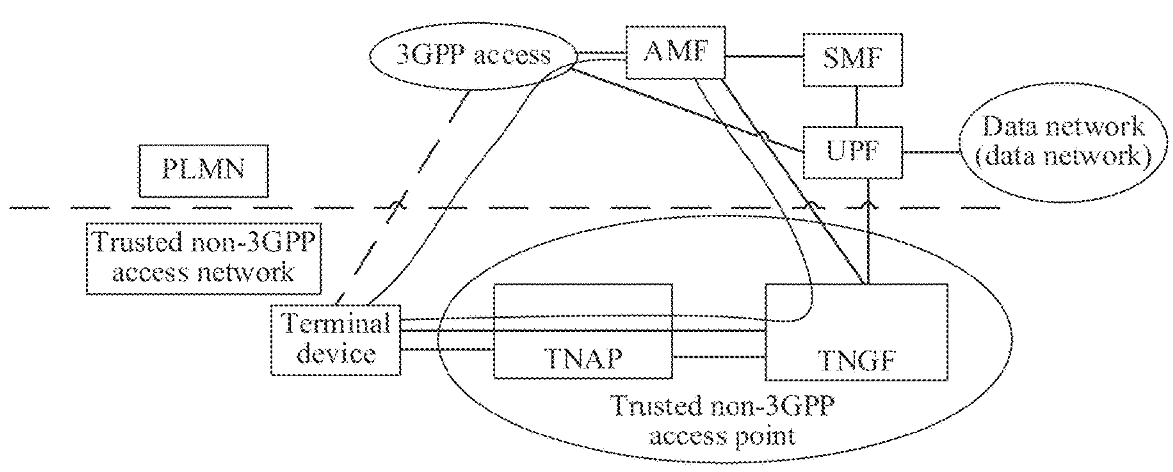
FIG. 2 is a diagram of a trusted non-3GPP access network according to an embodiment of this application.

FIG. 2 is a diagram of a trusted non-3GPP access system according to an embodiment of this application, for example, a Wi-Fi AP deployed in a public place. A terminal device first selects a PLMN, and selects a non-3GPP access network that provides a trusted connection in the PLMN. The terminal device then selects a connection type.

The following describes functions of the devices shown in FIG. 1 and FIG. 2.

An untrusted non-3GPP access point may be an access node that is not deployed by an operator, for example, a Wi-Fi access point (AP) deployed at home or in a store.

An N3IWF may be configured to allow interconnection and interworking between the terminal device and a 3GPP core network by using a non-3GPP technology. The N3IWF supports communication with a mobility management device through an N2 interface, and supports communication with a user plane device through an N3 interface.

A trusted non-3GPP access point may be an access node deployed by an operator, and may be referred to as a trusted non-3GPP access node (TNAP).

The TNAP may be configured to send an authentication, authorization, and accounting (AAA) message, for example, encapsulate an extensible authentication protocol (EAP) data packet into the AAA message and interact with a TNGF, and may be configured to forward an EAP message.

The TNGF may be configured to support the N2 interface and the N3 interface, may be configured to terminate EAP-5G signaling, and may implement AMF selection and process N2 signaling (e.g., relayed by the AMF) with an SMF, to support functions such as session and quality of service (QoS), and a transparent relay protocol data unit (PDU) between the terminal device and the user plane device.

A 3GPP access point may be an access node deployed by the operator.

A user plane function (UPF) network element is configured to perform functions such as user plane data forwarding, charging statistics based on a session/a flow level, and bandwidth limiting.

A session management function (SMF) network element is configured to perform functions such as session management, execution of a control policy, selection of the user plane function network element, and terminal internet protocol (IP) address allocation. An access and mobility management function (AMF) network element is configured to perform functions such as mobility management and access authentication/authorization. In addition, the access and mobility management function network element is further responsible for transferring a user policy to the terminal.

The terminal device may also be referred to as user equipment (UE), a mobile station, a mobile terminal, or the like. In FIG. 1, the UE represents the terminal. The terminal may be widely used in various scenarios, for example, device-to-device (device-to-device, D2D), vehicle to everything (V2X) communication, machine-type communication (MTC), internet of things (IoT), virtual reality, augmented reality, industrial control, autonomous driving, remote medical, a smart grid, smart furniture, smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robot arm, a smart home device, or the like. A specific technology and a specific device form that are used by the terminal are not limited in embodiments of this application.

Currently, the terminal device may access a non-public network through a non-3GPP access network device. In a conventional technology, when the terminal device accesses the non-public network through the non-3GPP access network device, the terminal device needs to be authenticated, to determine whether the terminal device can access the non-public network. Because the non-3GPP access network devices are different, manners of performing authentication are also different.

Therefore, if an authentication manner supported by the non-3GPP access network device is different from an authentication manner supported by the terminal device, authentication cannot be performed on the terminal device. For example, the terminal device may register with an SNPN by using SNPN credentials, or may register with an SNPN by using default UE credentials to perform onboarding, or may register with an SNPN by using credentials of a credentials holder. If the terminal device needs to register with the SNPN through the non-3GPP access network device, the terminal device needs to consider whether the non-3GPP access network device supports onboarding or external authentication. Otherwise, when the terminal device accesses the non-public network, if the non-3GPP access network device does not support onboarding or external authentication, the terminal device cannot further perform onboarding or external authentication. Therefore, when selecting the non-3GPP access network device, the terminal device needs to consider whether the network supports an onboarding service or an external authentication service. Otherwise, the non-3GPP access network device cannot identify whether the terminal device performs onboarding or external authentication, or cannot select a proper core network device for the terminal device, for example, an AMF. Therefore, how to select the proper non-3GPP access network device for the terminal device becomes a technical problem to be resolved.

Figure 3:
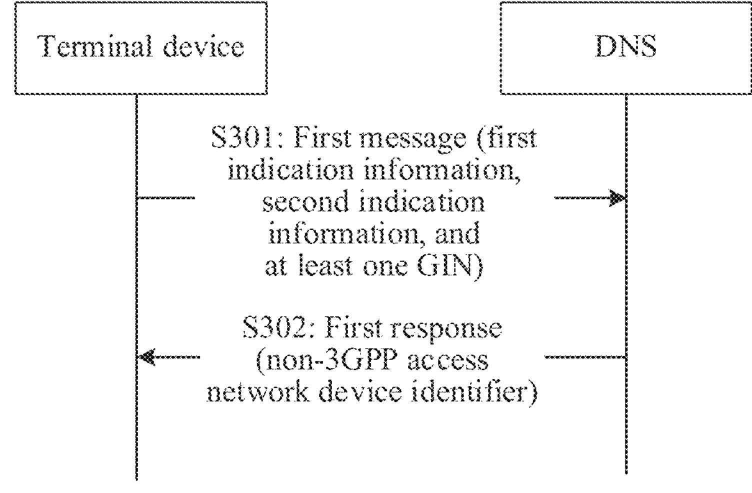
FIG. 3 is an example flowchart of an access network device selection method according to an embodiment of this application.

In view of this, embodiments of this application provide an access network device selection method. FIG. 3 is an example flowchart of an access network device selection method according to an embodiment of this application. The method may include the following operations. The embodiment shown in FIG. 3 may be applied to an untrusted non-3GPP communication system, for example, the communication system shown in FIG. 1.

S301: A terminal device sends a first message to a DNS. Correspondingly, the DNS receives the first message.

The first message may be used to obtain a non-3GPP access network device identifier. In S301, the terminal device may send a query message to the DNS. The following describes information included in the first message. The first message may include any one or more of the following 1 to 3.

1. First Indication Information

In a possible case, the first indication information may indicate onboarding. For example, when the terminal device needs to access a non-public network to perform onboarding, the first message may include the first indication information to indicate onboarding. For example, when the first message includes the first indication information, it may be considered that the terminal device needs to perform onboarding, or the terminal device performs onboarding, or a non-3GPP access network device to which the terminal device requests to be connected needs to support onboarding, or a non-public network in which a non-3GPP access network device to which the terminal device requests to be connected is located needs to support onboarding. When the first message does not include the first indication information, it may be considered that the terminal device does not need to perform onboarding, or the terminal device does not perform onboarding, or a non-3GPP access network device to which the terminal device requests to be connected does not need to support onboarding, or a non-public network in which a non-3GPP access network device to which the terminal device requests to be connected is located does not need to support onboarding.

It should be noted that, that the terminal device supports onboarding or performs onboarding may be understood as that the terminal device may perform authentication by using default UE credentials, or may perform authentication in another manner when accessing the non-public network. That the terminal device needs to support onboarding or needs to perform onboarding may be understood as that the terminal device needs to perform authentication by using the default UE credentials when accessing the non-public network. That the non-3GPP access network device supports onboarding or needs to support onboarding may be understood as that the non-3GPP access network device may identify indication information of onboarding sent by the terminal device, or may be understood as that the non-3GPP access network device may select a mobility management device (for example, an AMF) that supports onboarding. That the non-public network supports onboarding or needs to support onboarding may be understood as that the non-public network supports connecting to a default credentials server to support an authentication procedure performed on a terminal device that performs authentication by using the default UE credentials; or it may be understood as that the non-public network supports connecting to a provisioning server to send a credential (or a credential of an SNPN that the terminal device attempts to access) to the terminal device.

For example, when a value of a bit used to carry the first indication information is o, it indicates that onboarding is supported or onboarding needs to be supported; or when a value of a bit used to carry the first indication information is 1, it indicates that onboarding is supported or onboarding needs to be supported. For another example, one field, for example, onboarding, may be added to the first message to carry the first indication information. When the first message includes the onboarding field, it is considered that the terminal device supports onboarding or needs to support onboarding.

In another possible case, the first indication information may indicate whether the terminal device supports onboarding or needs to support onboarding. For example, when a value of a bit used to carry the first indication information is o, it indicates that onboarding is supported or onboarding needs to be supported; or when a value of a bit used to carry the first indication information is 1, it indicates that onboarding is not supported or onboarding does not need to be supported. The reverse is also applicable. For example, when a value of a bit used to carry the first indication information is o, it indicates that onboarding is not supported or onboarding does not need to be supported; or when a value of a bit used to carry the first indication information is 1, it indicates that onboarding is supported or onboarding needs to be supported.

In still another possible case, the first indication information may indicate whether the non-3GPP access network device or a non-public network in which the non-3GPP access network device is located supports onboarding or needs to support onboarding. For example, when a value of a bit used to carry the first indication information is o, it indicates that onboarding is supported or onboarding needs to be supported; or when a value of a bit used to carry the first indication information is 1, it indicates that onboarding is not supported or onboarding does not need to be supported. The reverse is also applicable. For example, when a value of a bit used to carry the first indication information is o, it indicates that onboarding is not supported or onboarding does not need to be supported; or when a value of a bit used to carry the first indication information is 1, it indicates that onboarding is supported or onboarding needs to be supported.

In yet another possible case, the first indication information may be included in domain name information, for example, a full qualified domain name (FQDN). In a possible implementation, some fields in the domain name information are the first indication information. For example, the full qualified domain name may be "n3iwf.5gc.snpnid999123456789ABCDE.mnco12, mcc345.onboardingo.pub.3gppnetwork.org", where onboarding may be the first indication information, and 0 is a value of the first indication information. A name of the first indication information is not limited in this application, and a field location of the first indication information in the full qualified domain name is not limited.

It may be understood that, a quantity of bits used to carry the first indication information may be set based on an empirical value, for example, may be 1 bit, 2 bits, or 3 bits. This is not specifically limited in this application.

For another example, a field may be added to the first message to carry the first indication information, for example, onboarding 0 and onboarding 1. For example, onboarding 0 indicates that onboarding is not supported or onboarding does not need to be supported, and onboarding 1 indicates that onboarding is supported or onboarding needs to be supported. The reverse is also applicable. Onboarding 1 indicates that onboarding is not supported or onboarding does not need to be supported, and onboarding 0 indicates that onboarding is supported or onboarding needs to be supported.

In yet another possible case, the first indication information may be included in domain name information, for example, a full qualified domain name (FQDN). In a possible implementation, some fields in the domain name information are the first indication information. For example, the full qualified domain name may be "n3iwf.5gc.snpnid<SNPNID>.mcc<MCC>.visited-country.onboarding.pub.3gppnetwork.org" (for example, "n3iwf.5gc.snpnid999123456789ABCDE.mcc345.visited-country.onboarding.pub.3gppnetwork.org"); and for another example, the full qualified domain name may be "n3iwf.5gc.snpnid<SNPNID>.onboarding.pub. 3gppnetwork.org" (for example, "n3iwf.5gc.snpnid456123789ABCDE.onboarding.pub. 3gppnetwork.org"), where onboarding may be the first indication information. When the FQDN includes onboarding, it indicates that the non-3GPP access network device that supports onboarding is selected, or indicates that the selected non-3GPP access network device supports onboarding. A name of the first indication information is not limited in this application, and a field location of the first indication information in the full qualified domain name is not limited.

It may be understood that, a quantity of bits or a field construction used to carry the first indication information may be set based on an empirical value, for example, may be 1 bit, 2 bits, or 3 bits, or a field may be a character string, a number, or the like. This is not specifically limited in this application.

For another example, one field for example, onboarding, may be added to the first message to carry the first indication information. For example, including onboarding indicates supporting onboarding or indicates that the non-3GPP access network device that supports onboarding needs to be selected. It should be noted that, a structure of the first indication information is not specifically limited in embodiments of this application. The first indication information can indicate onboarding, or indicate whether the terminal device supports onboarding, or indicate whether the terminal device needs to support onboarding, or indicate whether the non-3GPP access network device supports onboarding, or indicate whether the non-3GPP access network device needs to support onboarding, or indicate whether the non-public network in which the non-3GPP access network device is located supports onboarding, or indicate whether the non-public network in which the non-3GPP access network device is located needs to support onboarding.

Based on the foregoing solution, the terminal device may indicate, to the DNS through the first indication information, whether the terminal device, the non-3GPP access network device, or the non-public network in which the non-3GPP access network device is located needs to support onboarding. Therefore, when selecting the non-3GPP access network device for the terminal device, the DNS may consider the first indication information, to select a proper non-3GPP access network device for the terminal device based on the indication of the terminal device. For example, when the terminal device supports onboarding, or needs to support onboarding, or the non-3GPP access network device supports onboarding, or the non-3GPP access network device needs to support onboarding, or the non-public network in which the non-3GPP access network device is located needs to support onboarding, the DNS may select, for the terminal device, a non-3GPP access network device capable of performing onboarding. In this way, the DNS can support the terminal device in registering, through the non-3GPP access network, with the non-public network to perform onboarding.

2. Second Indication Information

In a possible case, the first indication information may indicate external authentication. For example, when the terminal device needs to perform external authentication or the terminal device needs to access the SNPN by using an external credential, the first message may include the second indication information, which indicates external authentication, or indicates the external credential, or indicates that the terminal device accesses the SNPN by using a credential of a credentials holder other than the SNPN. For example, when the first message includes the second indication information, it may be considered that the terminal device needs to support external authentication, or the terminal device supports external authentication, or the non-3GPP access network device supports external authentication, or the non-3GPP access network device needs to support external authentication, or the non-public network in which the non-3GPP access network device is located supports external authentication, or the non-public network in which the non-3GPP access network device is located needs to support external authentication. When the first message does not include the second indication information, it may be considered that the terminal device does not need to support external authentication, or the terminal device does not support external authentication, or the non-3GPP access network device does not support external authentication, or the non-3GPP access network device does not need to support external authentication, or the non-public network in which the non-3GPP access network device is located does not support external authentication, or the non-public network in which the non-3GPP access network device is located does not need to support external authentication.

It should be noted that, that the terminal device supports external authentication may be understood as that the terminal device may perform authentication in a manner of external authentication, or may perform authentication in another manner when accessing the non-public network. That the terminal device needs to support external authentication may be understood as that the terminal device needs to perform authentication in a manner of external authentication when accessing the non-public network. That the non-3GPP access network device supports or needs to support external authentication may be understood as that the non-3GPP access network device may select a mobility management device (for example, an AMF) that supports external authentication. That the non-public network in which the non-3GPP access network device is located supports or needs to support external authentication may be understood as that, the non-public network may support connecting to a credentials holder other than the non-public network, to perform an authentication procedure on a terminal device that uses a credential of the credentials holder.

For example, when a value of a bit used to carry the second indication information is o, it indicates that external authentication is supported or external authentication needs to be supported; or when a value of a bit used to carry the second indication information is 1, it indicates that external authentication is supported or external authentication needs to be supported. For another example, one field may be added to the first message to carry the second indication information, for example, external authentication. When the first message includes the field of external authentication, it is considered that the terminal device supports external authentication or needs to support external authentication.

In another possible case, the second indication information may indicate whether the terminal device supports external authentication or needs to support external authentication. For example, when a value of a bit used to carry the second indication information is o, it indicates that external authentication is supported or external authentication needs to be supported; or when a value of a bit used to carry the second indication information is 1, it indicates that external authentication is not supported or external authentication does not need to be supported. The reverse is also applicable, for example, when a value of a bit used to carry the second indication information is o, it indicates that external authentication is not supported or external authentication does not need to be supported; or when a value of a bit used to carry the second indication information is 1, it indicates that external authentication is supported or external authentication needs to be supported.

In still another possible case, the second indication information may indicate whether the non-3GPP access network device or a non-public network in which the non-3GPP access network device is located supports external authentication or needs to support external authentication. For example, when a value of a bit used to carry the second indication information is o, it indicates that external authentication is supported or external authentication needs to be supported; or when a value of a bit used to carry the second indication information is 1, it indicates that external authentication is not supported or external authentication does not need to be supported. The reverse is also applicable, for example, when a value of a bit used to carry the second indication information is o, it indicates that external authentication is not supported or external authentication does not need to be supported; or when a value of a bit used to carry the second indication information is 1, it indicates that external authentication is supported or external authentication needs to be supported.

In yet another possible case, the second indication information may be included in domain name information, for example, included in a full qualified domain name (FQDN). In a possible implementation, some fields in the domain name information are the second indication information. For example, the full qualified domain name may be "n3iwf.5gc.snpnid999123456789ABCDE.mnco12, mcc345.ExternalAuthenticationo.pub.3gppnetwork.org", where ExternalAuthentication may be the first indication information, and 0 is a value of the second indication information. A name of the second indication information is not limited in this application, and a field location of the second indication information in the full qualified domain name is not limited.

It may be understood that, a quantity of bits used to carry the second indication information may be set based on an empirical value, for example, may be 1 bit, 2 bits, or 3 bits. This is not specifically limited in this application.

For another example, one field may be added to the first message to carry the first indication information, for example, external authentication 0 and external authentication 1. For example, external authentication 0 indicates that external authentication is not supported or external authentication does not need to be supported, and external authentication 1 indicates that external authentication is supported or external authentication needs to be supported. The reverse is also applicable, external authentication 1 indicates that external authentication is not supported or external authentication does not need to be supported, and external authentication 0 indicates that external authentication is supported or external authentication needs to be supported.

It should be noted that, a structure of the second indication information is not specifically limited in embodiments of this application. The second indication information can indicate external authentication, or indicate whether the terminal device supports external authentication, or whether the terminal device needs to support external authentication.

The following provides descriptions with reference to the first indication information and the second indication information.

For example, it is assumed that the first message includes the first indication information and the second indication information. For example, the first message includes onboarding 1 and external authentication 1. Onboarding 1 indicates that onboarding is supported, and external authentication 1 indicates that external authentication is supported. In this case, it may be considered that the terminal device supports both onboarding and external authentication, or the non-3GPP access network device supports both onboarding and external authentication, or the non-public network in which the non-3GPP access network device is located supports both onboarding and external authentication.

For example, it is assumed that the first message includes the first indication information and the second indication information. For example, the first message includes onboarding 0 and external authentication 1. Onboarding 0 indicates that onboarding is not supported, and external authentication 1 indicates that external authentication is supported. In this case, it may be considered that the terminal device does not support onboarding and supports external authentication, or the non-3GPP access network device may not need to support onboarding but need to support external authentication, or the non-public network in which the non-3GPP access network device is located may not need to support onboarding but need to support external authentication.

Based on the foregoing solution, the terminal device may indicate, to the DNS through the second indication information, whether the terminal device needs to support external authentication, or indicate whether the non-3GPP access network device or the non-public network that supports external authentication needs to be selected. Therefore, when selecting the non-3GPP access network device for the terminal device, the DNS may consider the second indication information, to select a proper non-3GPP access network device for the terminal device based on the indication of the terminal device. For example, when the terminal device supports external authentication or needs to support external authentication, or the non-3GPP access network device needs to support external authentication, or the non-public network in which the non-3GPP access network device is located needs to support external authentication, the DNS may select, for the terminal device, a non-3GPP access network device capable of performing external authentication. In this way, the DNS can support the terminal device in registering, by using the external credential, with the non-public network through the non-3GPP access network.

3. At Least One GIN

A GIN may be an identifier of a group to which one or more default credentials servers or credentials holders belong. Each GIN may indicate that external authentication is supported or may indicate onboarding. For example, when one GIN indicates that external authentication is supported, one or more default credentials servers or credentials holders included in a group corresponding to the GIN support external authentication. For another example, when one GIN indicates onboarding, one or more default credentials servers or credentials holders included in a group corresponding to the GIN support onboarding.

Optionally, when the terminal device supports onboarding or needs to support onboarding, or the terminal device needs to select the non-3GPP access network device or the non-public network that supports onboarding, the at least one GIN may indicate onboarding. When the terminal device supports external authentication or needs to support external authentication, or the terminal device needs to select the non-3GPP access network device or the non-public network that supports external authentication, the at least one GIN may indicate external authentication.

For example, when the terminal device supports onboarding or needs to select a non-3GPP access network device or a non-public network that supports onboarding, the terminal device may use a GIN indicating that onboarding is supported, to enable the selected non-3GPP access network device to support performing onboarding, or to enable the non-public network in which the non-3GPP access network device is located to support connecting to one or more default credentials servers or credentials holders included in a group corresponding to the GIN to perform onboarding. When the terminal device supports external authentication or needs to select a non-3GPP access network device or a non-public network that supports external authentication, the terminal device may use a GIN indicating that external authentication is supported, to enable the selected non-3GPP access network device to support performing external authentication, or to enable the non-public network in which the non-3GPP access network device is located to support connecting to one or more default credentials servers or credentials holders included in a group corresponding to the GIN to perform external authentication.

Based on the foregoing solution, the terminal device may indicate, to the DNS through the GIN, whether the terminal device supports onboarding or external authentication, or indicate whether the selected non-3GPP access network device or the non-public network needs to support onboarding or external authentication. Therefore, when selecting the non-3GPP access network device for the terminal device, the DNS may consider the GIN, to select a proper non-3GPP access network device for the terminal device based on the indication of the terminal device. For example, when the terminal device supports external authentication or needs to support external authentication, or the non-3GPP access network device or the non-public network needs to support external authentication, the DNS may select, for the terminal device, a non-3GPP access network device capable of performing external authentication. In this way, the DNS can support the terminal device in registering, by using the external credential, with the non-public network through the non-3GPP access network.

In an example, the first message may further include a non-public network identifier. For example, the first message may include one or more non-public network identifiers. The non-public network identifier may include an SNPN identifier or a PNI-NPN identifier. For example, the first message may include one or more SNPN identifiers, or the first message may include one or more PNI-NPN identifiers, or the first message may include one or more SNPN identifiers and PNI-NPN identifiers. In a possible implementation, the PNI-NPN identifier is a PLMN ID. The PLMN ID (public land mobile network identifier) may be a combination of a mobile country code (MCC) and a mobile network code (MNC). In a possible implementation, the SNPN identifier is a combination of a PLMN ID and a network identifier (NID).

One or more non-3GPP access network devices included in non-public networks corresponding to the one or more non-public network identifiers may support the terminal device in performing onboarding, or the one or more non-public network identifiers may support the terminal device in performing external authentication. For example, if the first message includes a non-public network identifier 1, one or more non-3GPP access network devices included in a non-public network 1 corresponding to the non-public network identifier 1 may support the terminal device in performing onboarding, or support the terminal device in performing external authentication. Optionally, a non-public network corresponding to one non-public network identifier may include one or more non-3GPP access network devices. Each non-3GPP access network device may support the terminal device only in performing onboarding, or may support the terminal device only in performing external authentication. Optionally, each non-3GPP access network device may support the terminal device in performing onboarding, or may support the terminal device in performing external authentication.

For example, it is assumed that the first message includes a GIN 1 and a GIN 2. The GIN 1 indicates that onboarding is supported or identifies a group that supports onboarding, the GIN 2 indicates that external authentication is supported or identifies a group that supports external authentication, and the first message further includes a non-public network identifier 1. In this case, a non-public network (referred to as a first non-public network) corresponding to the non-public network identifier 1 may support connecting to a default credentials server or a credentials holder included in a group corresponding to the GIN 1 to perform onboarding. The first non-public network also supports connecting to a default credentials server or a credentials holder included in a group corresponding to the GIN 2 to perform external authentication. Optionally, when the terminal device supports onboarding or needs to support onboarding, or the terminal device needs to select the non-3GPP access network device or the non-public network that supports onboarding, the first non-public network may be connected to the default credentials server or the credentials holder included in the group corresponding to the GIN 1 to perform onboarding. When the terminal device supports external authentication or needs to support external authentication, or the terminal device needs to select the non-3GPP access network device or the non-public network that supports external authentication, the first non-public network may be connected to the default credentials server or the credentials holder included in the group corresponding to the GIN 2 to perform external authentication.

In another example, the first message may further include domain name information. For example, the first message may include a full qualified domain name (FQDN). Optionally, one or more of the first indication information, the second indication information, and the at least one GIN may be included in the domain name information. In other words, the domain name information may include one or more of the first indication information, the second indication information, and the at least one GIN. For example, when the domain name information includes one or more of the first indication information, the second indication information, and the at least one GIN, refer to the foregoing implementations 1 to 3.

In a possible implementation, the one or more GINs may be included in the domain name information, for example, the full qualified domain name (FQDN). In a possible implementation, some fields in the domain name information are the one or more GINs. For example, the full qualified domain name may be "n3iwf.5gc.GIN999123456789ABCDE.snpnid999123456789ABCDE.mncol2,mcc345.pub.3gppnetwork.org", where 999123456789ABCDE is a value of the GIN. A name or a value of the GIN is not limited in this application, and a field location of the GIN in the full qualified domain name is not limited in this application.

S302: The DNS sends a first response to the terminal device.

Correspondingly, the terminal device receives the first response. The first response may be a response message of the first message in S301. For example, the DNS may send a query response to the terminal device.

The first response in S302 may include the non-3GPP access network device identifier. A non-3GPP access network device corresponding to the non-3GPP access network device identifier herein may be an untrusted non-3GPP access network device or an N3IWF. The non-3GPP access network device identifier may be determined by the DNS based on the first message in S301.

For example, it is assumed that the first message includes the first indication information, and the first indication information indicates onboarding. Then, the DNS may select, for the terminal device based on the first indication information, the non-3GPP access network device capable of performing onboarding. For another example, it is assumed that the first message includes the second indication information, and the second indication information indicates external authentication. Then, the DNS may select, for the terminal device based on the second indication information, the non-3GPP access network device capable of performing external authentication. The rest can be deduced by analogy. The DNS may select a proper non-3GPP access network device for the terminal device based on information included in the first message, for example, one or more of the first indication information, the second indication information, and the at least one GIN. The DNS may send the selected non-3GPP access network device identifier to the terminal device.

Based on the foregoing solution, the terminal device may indicate, to the DNS through the first indication information, the second indication information, and the at least one GIN, a capability that needs to be supported by the selected non-3GPP access network device, for example, whether onboarding or external authentication is supported. In this way, when selecting the non-3GPP access network device for the terminal device, the DNS may select the proper non-3GPP access network device for the terminal device based on the indication of the terminal device.

In a possible implementation, the terminal device may send first information to the non-3GPP access network device. The first information indicates onboarding or external authentication. In other words, the terminal device may send an authentication manner to the non-3GPP access network device. For example, if the terminal device supports onboarding or needs to perform onboarding, or the terminal device needs to select the non-3GPP access network device that supports onboarding, the first information sent by the terminal device to the non-3GPP access network device may indicate onboarding. For an implementation of the first information, refer to the foregoing implementation of the first indication information.

For example, if the terminal device supports external authentication or needs to perform external authentication, or the terminal device needs to select the non-3GPP access network device that supports external authentication, the first information sent by the terminal device to the non-3GPP access network device may indicate external authentication. For an implementation of the first information, refer to the foregoing implementation of the second indication information.

Figure 4:
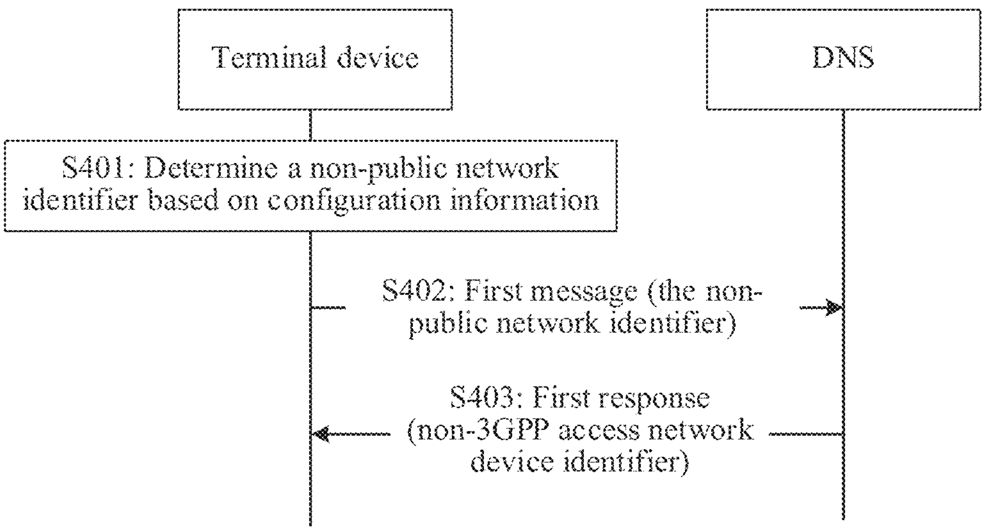
FIG. 4 is an example flowchart of an access network device selection method according to an embodiment of this application.

In the embodiment shown in FIG. 3, the terminal device indicates, to the DNS, whether onboarding or external authentication is supported. Therefore, the DNS may select the proper non-3GPP access network device for the terminal device. In the following, FIG. 4 is used to describe another access network device selection method according to an embodiment of this application. In the embodiment shown in FIG. 4, a non-public network identifier that supports external authentication and a non-public network identifier that supports onboarding may be preconfigured. Therefore, by indicating the non-public network identifier to a DNS, a terminal device may indicate, to the DNS, whether the terminal device supports onboarding or external authentication. In this way, the DNS may also select a proper non-3GPP access network device for the terminal device.

FIG. 4 is an example flowchart of an access network device selection method according to an embodiment of this application. The method may include the following operations.

S401: A terminal device determines a non-public network identifier based on configuration information.

The configuration information may include at least one of a non-public network identifier that supports onboarding and a non-public network identifier that supports external authentication. There may be one or more non-public network identifiers that support onboarding. In other words, the configuration information may include one or more non-public network identifiers that support onboarding. Similarly, there may be one or more non-public network identifiers that support external authentication. In other words, the configuration information may include one or more non-public network identifiers that support external authentication.

It may be understood that, all non-3GPP access network devices included in a non-public network corresponding to the non-public network identifier that supports onboarding may support onboarding. Similarly, all non-3GPP access network devices included in a non-public network corresponding to the non-public network identifier that supports external authentication may support external authentication.

In S401, if the terminal device supports onboarding or needs to support onboarding, the terminal device may determine one non-public network identifier from one or more non-public network identifiers that support onboarding and that are included in the configuration information. If the terminal device supports external authentication or needs to support external authentication, the terminal device may determine one non-public network identifier from one or more non-public network identifiers that support external authentication and that are included in the configuration information.

It may be understood that, if the configuration information does not include the non-public network identifier that supports onboarding, it may be considered that the terminal device does not support onboarding, or it is considered that there is no non-public network that supports onboarding, or it is considered that there is no non-public network in which the non-3GPP access network device is deployed and onboarding is supported. If the configuration information does not include the non-public network identifier that supports external authentication, it may be considered that the terminal device does not support external authentication, or it is considered that there is no non-public network that supports external authentication, or it is considered that there is no non-public network in which the non-3GPP access network device is deployed and external authentication is supported.

For example, when the configuration information includes one or more non-public network identifiers that support onboarding, and does not include one or more non-public network identifiers that support external authentication, it may be considered that the terminal device does not support external authentication, or does not need to select a non-3GPP access network device or a non-public network that supports external authentication, or it is considered that there is no non-public network that supports external authentication, or it is considered that no non-3GPP access network device and no non-public network that supports external authentication is deployed. The terminal device may determine one non-public network identifier from the one or more non-public network identifiers that support onboarding. For example, when the configuration information includes one or more non-public network identifiers that support external authentication, and does not include one or more non-public network identifiers that support onboarding, it may be considered that the terminal device does not support onboarding, or does not need to select a non-3GPP access network device or a non-public network that supports onboarding, or it is considered that there is no non-public network that supports onboarding, or it is considered that no non-3GPP access network device and no non-public network that supports onboarding is deployed. The terminal device may determine one non-public network identifier from the one or more non-public network identifiers that support external authentication.

S402: The terminal device sends a first message to a DNS.

The first message may be a query message. The first message may be used to request to obtain a non-3GPP access network device identifier. The first message may include the non-public network identifier determined in S401.

S403: The DNS sends a first response to the terminal device.

The first response may be a response to the first message in S402, for example, may be a query response. The first response may include a non-3GPP access network device selected by the DNS for the terminal device. For example, the DNS may select, based on the non-public network identifier included in the first message in S402, the non-3GPP access network device from the non-public network corresponding to the non-public network identifier. In addition, the DNS adds the identifier of the selected non-3GPP access network device to the first response, and sends the first response to the terminal device.

Based on the embodiment shown in FIG. 4, the terminal device may select the non-public network identifier through the configuration information. Therefore, the terminal device may indicate, to the DNS through the non-public network identifier, a capability that needs to be supported by the selected non-public network or the non-3GPP access network device. In this way, the DNS may select, through the non-public network identifier, one non-3GPP access network device from the non-3GPP access network device included in the non-public network corresponding to the non-public network identifier.

FIG. 3 and FIG. 4 describe implementations in which the DNS selects the non-3GPP access network device for the terminal device. The following describes a registration procedure of a terminal device with reference to FIG. 5, and the registration procedure may include the following operations.

S501: The terminal device sets up an IPsec security association (IPsec SA) with a non-3GPP access network device.

For example, the terminal device may set up the IPsec SA with the non-3GPP access network device by initiating an internet key exchange (IKE) protocol initial exchange. The non-3GPP access network device may be a non-3GPP access network device corresponding to the non-3GPP access network device identifier sent by the DNS to the terminal device in S302 or S403.

S502: The terminal device sends a first request message to the non-3GPP access network device.

Correspondingly, the non-3GPP access network device receives the first request message.

For example, the terminal device may send an IKE_AUTH request message to the non-3GPP access network device.

Optionally, the first request message does not include a payload (e.g., an AUTH payload). This indicates that the first request message is used for identity authentication. For example, when the first request message does not include the payload, it may indicate that the first request message is used for identity authentication protocol (EAP) signaling exchange.

S503: The non-3GPP access network device sends a first response message to the terminal device.

Correspondingly, the terminal device receives the first response message.

The first response message may be a response message of the first request message in S502. For example, the first response message may be an IKE_AUTH response message.

Optionally, the response message includes an EAP request or a 5th generation mobile communication technology (5G)-start data packet. The EAP request or the 5G-start data packet may notify the terminal device to initiate an EAP-5G session.

S504: The terminal device sends a second request message to the non-3GPP access network device.

Correspondingly, the non-3GPP access network device receives the second request message.

For example, the terminal device may send an IKE_AUTH request message to the non-3GPP access network device.

The second request message may include an EAP response or a 5G-NAS data packet.

The 5G-NAS data packet may include an access network (AN) parameter and a registration request message. The AN parameter includes parameter information used by the non-3GPP access network device to select an AMF, for example, a globally unique AMF identifier (GUAMI) or a selected PLMN ID. Optionally, the parameter information for selecting the AMF may further include a network identification (NID). It may be understood that, in an SNPN scenario, the PLMN ID and the NID may uniquely identify one SNPN.

Optionally, the terminal device may include first information in the AN parameter. For example, if the terminal device performs onboarding, the first information may indicate onboarding. For another example, if the terminal device performs external authentication, the first information may indicate external authentication.

S505: The non-3GPP access network device sends the registration request message to the AMF.

In a possible implementation, the non-3GPP access network device selects the AMF, and sends the registration request message to the selected AMF. In a possible implementation, the non-3GPP access network device may select the AMF based on the AN parameter.

For example, if the AN parameter includes the first information, and the first information indicates onboarding, the non-3GPP access network device selects, for the terminal device, an AMF that supports onboarding. If the AN parameter includes the first information, and the first information indicates external authentication, the non-3GPP access network device selects, for the terminal device, an AMF that supports external authentication.

S506: The AMF initiates or requests to perform authentication on the terminal device.

For example, when the terminal device indicates to perform onboarding or needs to perform onboarding, the AMF may select a corresponding authentication device to perform authentication on the terminal device. For example, when an authentication server function (AUSF) and a unified data management (UDM) device are deployed in a default credentials server domain indicated by an identifier of the terminal device, the AMF selects the AUSF in the default credentials server domain to perform authentication on the terminal device. When an AAA server is deployed in a default credentials server indicated by the identifier of the terminal device, the AMF selects a local AUSF (e.g., an AUSF located in a same network as the AMF) to perform authentication on the terminal device or participate in an authentication procedure of the terminal device. When the terminal device indicates to perform external authentication or needs to perform external authentication, the AMF may select a corresponding authentication device to perform authentication on the terminal device. For example, when an authentication server function (authentication server function, AUSF) and a unified data management (UDM) device are deployed in a credentials holder indicated by an identifier of the terminal device, the AMF selects the AUSF in the credentials holder to perform authentication on the terminal device. When an authentication, authorization, and accounting (AAA) server is deployed in the credentials holder indicated by the identifier of the terminal device, the AMF selects a local AUSF (e.g., an AUSF located in a same network as the AMF) to perform authentication on the terminal device or participate in an authentication procedure of the terminal device.

It may be understood that, an authentication service of the terminal device may be provided by the authentication service function (AUSF). In other words, the AUSF may perform an authentication operation on the terminal device. The AUSF may obtain authentication data or subscription data of the terminal device from a unified data management (UDM) function. If the terminal device performs onboarding and the AUSF and the UDM are deployed in a DCS domain, the AUSF and the UDM may be the AUSF and the UDM in the DCS domain, and the AUSF and the UDM in the DCS domain may be understood as the AUSF and the UDM that are deployed in the DCS. If the terminal device performs external authentication and the AUSF and the UDM are deployed in the CH, the AUSF and the UDM may be the AUSF and the UDM of the CH, and an AUSF and a UDM in a CH domain may be understood as the AUSF and the UDM that are deployed in the CH. Optionally, if the terminal device performs onboarding, and an authentication, authorization, and accounting server (AAA Server) is deployed in the DCS domain, the AAA server in the DCS domain may be used instead of the UDM, and the AUSF is the AUSF located in the same network as the AMF. In other words, the AAA server in the DCS domain performs authentication on the terminal device. Optionally, if the terminal device performs external authentication and the AAA server is deployed in the CH, the AAA server in the CH may be used instead of the UDM, and the AUSF is the AUSF located in the same network as the AMF. In other words, the AAA server in the CH may perform authentication on the terminal device.

Figure 6:
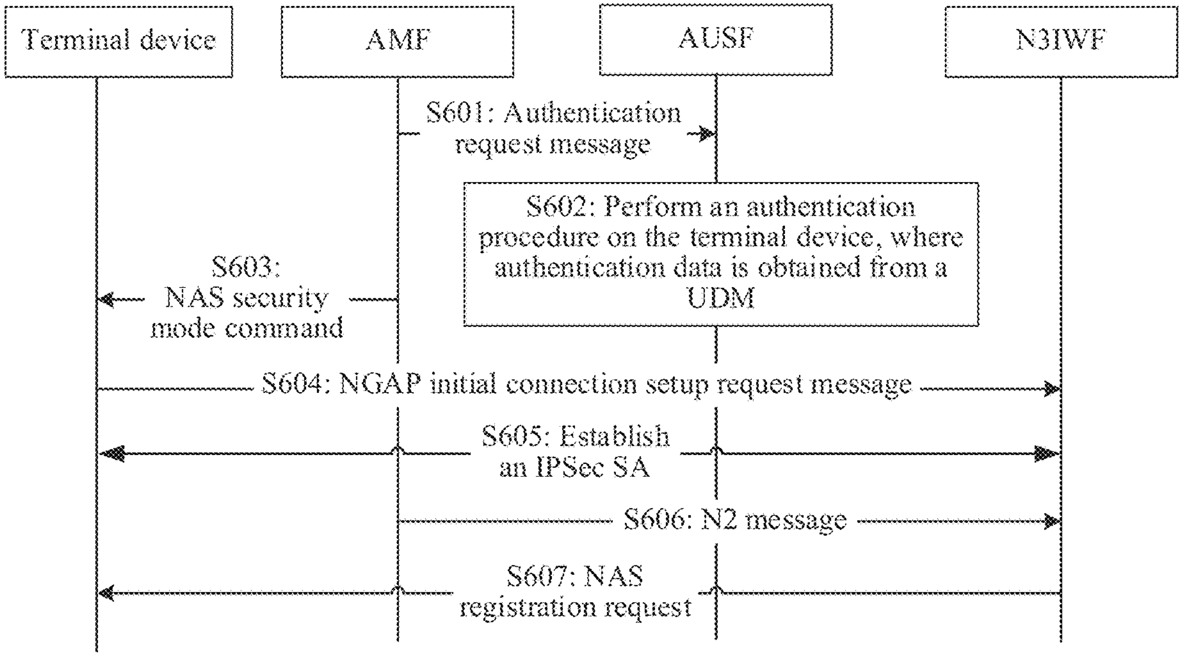
FIG. 6 is an example flowchart of performing authentication on a terminal device according to an embodiment of this application.

The following describes, through FIG. 6, a manner of performing authentication on a terminal device in embodiments of this application. FIG. 6 is an example flowchart of authentication according to an embodiment of this application, including the following operations.

S601: An AMF sends an authentication request message to an AUSF.

Correspondingly, the AUSF receives the authentication request message.

The AMF may select the AUSF, and send the authentication request message to the AUSF. The AUSF may provide an authentication service, and may perform authentication on the terminal device.

S602: The AUSF performs an authentication procedure on the terminal device, where authentication data is obtained from a UDM.

All authentication-related data packets are encapsulated through a non-access stratum (NAS) message. The NAS message is encapsulated through an EAP or a 5th generation mobile communication technology (5G)-NAS data packet. After the authentication is completed, the AUSF sends a security anchor function (seaf) key to the AMF. The AMF uses this key to derive a NAS security key and a security key of an N3IWF. The key of the N3IWF is used by the terminal device and the N3IWF to set up an IPSec SA.

S603: The AMF sends a NAS security mode command to the terminal device.

The NAS security mode command may be used to activate NAS security. The NAS security mode command may include EAP-success information, which indicates that 3G-WLAN interworking authentication and key assignment protocol (EAP-AKA') authentication performed by a core network succeeds. The N3IWF forwards, to the terminal device, the NAS security mode command sent by the AMF, and sends, to the AMF, a NAS security mode complete message sent by the terminal device.

S604: The AMF sends an NGAP initial context setup request message to the N3IWF.

For example, after the AMF receives the NAS security mode complete message from the terminal device, the AMF may send the NGAP initial context setup request to the N3IWF. The NAP initial context setup request may include the key of the N3IWF.

The N3IWF may send the EPA-success information to the terminal device.

S605: The terminal device sets up an IPsec SA with the N3IWF.

For example, the terminal device may set up the IPsec SA with the N3IWF through the key of the N3IWF.

The IPsec SA is referred to as a signaling IPsec SA. After the signaling IPsec SA is set up, the N3IWF notifies the AMF through an NGAP initial context setup response that a UE context has been created.

In this case, the signaling IPsec SA is configured to operate in a tunnel mode, and the N3IWF allocates an inner IP address and a NAS address (NAS_IP_ADDRESS) to the terminal device. Transmission of all subsequent NAS messages is over the signaling IPsec SA. For a NAS message sent by the terminal device to the AMF, a source address is the inner IP address of the UE, and a destination address is the NAS address. For a NAS message sent by the AMF to the terminal device, a source address is the NAS address, and a destination address is the inner IP address of the UE.

S606: The AMF sends an N2 message to the N3IWF.

The N2 message may include a NAS registration accept message sent to the terminal device. During registration with the UDM, the AMF needs to provide the UDM with an access type being non-3GPP access.

S607: The N3IWF sends a NAS registration request to the terminal device through the signaling IPsec SA.

Authentication on the terminal device may be implemented based on S601 to S607. Therefore, the terminal device may register with or access a non-public network through a non-3GPP access network device.

Embodiments shown in FIG. 3 to FIG. 6 may be applied to an untrusted non-3GPP access system. In the following, FIG. 8 is used to describe another access network device selection method according to an embodiment of this application. The embodiment shown in FIG. 7 may be applied to a trusted non-3GPP access system. The communication system shown in FIG. 3 may include the following operations.

S701: A trusted non-3GPP access network device sends one or more identifiers of at least one non-public network.

For example, the trusted non-3GPP access network device may send a broadcast message. The broadcast message may include the one or more identifiers of the at least one non-public network. For example, the trusted non-3GPP access network device may broadcast a network list. The network list may include the one or more identifiers of the at least one non-public network. The identifier of the at least one non-public network indicates a non-public network to which the trusted non-3GPP access network device supports connecting.

In a possible implementation, the broadcast message may further include one or more of first indication information, second indication information, and at least one GIN. Details are separately described below.

The first indication information indicates onboarding. For example, the first indication information may indicate that at least one non-public network in S701 supports onboarding.

For example, the broadcast message may include the first indication information and identifiers of the one or more non-public networks. It may be understood as that, the one or more non-public networks support onboarding. In a possible case, the broadcast message may include a network list. For example, the network list may include the identifiers of the one or more non-public networks that support onboarding, and the first indication information may be a name of the network list. Each non-public network in the network list indicates a non-public network to which the trusted non-3GPP access network device supports connecting.

The second indication information indicates external authentication. For example, the second indication information may indicate that the at least one non-public network in S701 supports external authentication.

For example, the broadcast message may include the second indication information and identifiers of the one or more non-public networks. In this case, it may be understood as that, the one or more non-public networks support external authentication. In a possible case, the broadcast message may include the network list. For example, the network list may include the identifiers of the one or more non-public networks that support external authentication, and the second indication information may be a name of the network list. Each non-public network in the network list indicates a non-public network to which the trusted non-3GPP access network device supports connecting.

The at least one GIN is an identifier of a group to which one or more default credentials servers or credentials holders belong. This indicates one or more non-public networks to which the trusted non-3GPP access network device may be connected, and supports connecting to a default credentials server or a credentials holder included in the at least one GIN to perform external authentication or onboarding.

For example, the broadcast message may include at least one GIN that supports onboarding, which indicates one or more non-public networks to which the trusted non-3GPP access network device may be connected, and supports connecting to a default credentials server or a credentials holder included in the at least one GIN to perform onboarding. For another example, the broadcast message may include at least one GIN that supports external authentication, which indicates one or more non-public networks to which the trusted non-3GPP access network device may be connected, and supports connecting to a default credentials server or a credentials holder included in the at least one GIN to perform external authentication.

The following describes the network list included in the broadcast message in Table 1.

TABLE 1

Example of a network list

| Name | Non-public network identifier | GIN |
|---|---|---|
| Support onboarding | Non-public network identifier 1, non-public network identifier 2, and non-public network identifier 3 | GIN 1 and GIN 3 |
| Support external authentication | Non-public network identifier 4 and non-public network identifier 5 | GIN 2 |

TABLE 2

Example of a network list

| Name | Non-public network identifier |
|---|---|
| Support onboarding | Non-public network identifier 1 (GIN 1 and GIN 2), non-public network identifier 2 (GIN 1 and GIN 3), and non-public network identifier 3 (GIN 2 and GIN 3) |
| Support external authentication | Non-public network identifier 4 (GIN 4 and GIN 5) and non-public network identifier 5 (GIN 5 and GIN 6) |

TABLE 3

Example of a network list

| GIN | Non-public network identifier |
|---|---|
| GIN 1 | Non-public network identifier 1, non-public network identifier 2, and non-public network identifier 3 |
| GIN 3 | Non-public network identifier 4 and non-public network identifier 5 |

TABLE 4

| Example of a network list | |
|---|---|
| Non-public network identifier | GIN |
| Non-public network identifier 1 | GIN 1, GIN 2, and GIN 3 |
| Non-public network identifier 2 | GIN 2 and GIN 4 |

It may be learnt from Table 1 that, the non-public network identifiers that support onboarding may include the non-public network identifier 1, the non-public network identifier 2, and the non-public network identifier 3, and the GINs that support onboarding may include the GIN 1 and the GIN 3. It may be understood as that, a trusted non-3GPP access network device may be connected to a non-public network corresponding to any one of the non-public network identifier 1, the non-public network identifier 2, and the non-public network identifier 3, and the non-public networks corresponding to the non-public network identifier 1, the non-public network identifier 2, and the non-public network identifier 3 may be connected to a default credentials server or a credentials holder included in a group corresponding to either of the GIN 1 and the GIN 3, to perform onboarding for the terminal device. The non-public network identifiers that support external authentication may include the non-public network identifier 4 and the non-public network identifier 5, and the GIN that supports external authentication may include the GIN 2. It may be understood as that, the trusted non-3GPP access network device may be connected to a non-public network corresponding to either of the non-public network identifier 4 and the non-public network identifier 5, and the non-public network may be connected to a default credentials server or a credentials holder included in a group corresponding to the GIN 2, to perform external authentication for the terminal device. Table 1 shows an example of a network list.

It may be understood that, Table 1 does not constitute a limitation on the network list. Table 1 may include one or more rows of a first row or a second row, or Table 1 may include any one or more of a first column, a second column, and a third column. This is not specifically limited in this application.

It may be learnt from Table 2 that, the non-public network identifiers that support onboarding may include the non-public network identifier 1, the non-public network identifier 2, and the non-public network identifier 3, and the GIN of the non-public network that supports onboarding and that corresponds to the non-public network identifier 1 may include the GIN 1 and the GIN 3. It may be understood as that, the trusted non-3GPP access network device may be connected to a non-public network corresponding to any one of the non-public network identifier 1, the non-public network identifier 2, and the non-public network identifier 3, and the non-public network corresponding to the non-public network identifier 1 may be connected to a default credentials server or a credentials holder included in a group corresponding to either of the GIN 1 and the GIN 2, to perform onboarding for the terminal device. Alternatively, a non-public network corresponding to the non-public network identifier 2 may be connected to a default credentials server or a credentials holder included in a group corresponding to either of the GIN 1 and the GIN 3, to perform onboarding for the terminal device. Alternatively, a non-public network corresponding to the non-public network identifier 3 may be connected to a default credentials server or a credentials holder included in a group corresponding to either of the GIN 2 and the GIN3, to perform onboarding for the terminal device. The non-public network identifiers that support external authentication may include the non-public network identifier 4 and the non-public network identifier 5, and the GIN of the non-public network that supports external authentication and that corresponds to the non-public network identifier 4 may include the GIN 4 and the GIN 5. It may be understood as that, the trusted non-3GPP access network device may be connected to the non-public network corresponding to the non-public network identifier 4 and the identifier 5 of non-public network, and the non-public network corresponding to the non-public network identifier 4 may be connected to a default credentials server or a credentials holder included in a group corresponding to either of the GIN 4 and the GIN 5, to perform external authentication for the terminal device, or the non-public network corresponding to the non-public network identifier 5 may be connected to a default credentials server or a credentials holder included in a group corresponding to either of the GIN 5 and the GIN 6, to perform external authentication for the terminal device. Table 2 shows an example of a network list.

In a possible implementation, the trusted non-3GPP access network device may broadcast one or more GINs and one or more identifiers of the non-public network corresponding to each GIN. Each GIN may indicate that onboarding or external authentication is supported. For example, the group corresponding to the GIN 1 in Table 3 includes one or more default credentials servers, and the GIN 1 indicates that onboarding is supported. In other words, the non-public network corresponding to the non-public network identifier 1, the non-public network identifier 2, and the non-public network identifier 3 may support onboarding. For another example, the group corresponding to the GIN 3 in Table 3 includes one or more credentials holders, and the GIN 3 is used to support external authentication. In other words, the non-public network corresponding to the non-public network identifier 4 and the non-public network identifier 5 may support external authentication.

In another possible implementation, the trusted non-3GPP access network device may broadcast one or more non-public network identifiers and one or more GINs corresponding to each non-public network identifier. The GIN may indicate that onboarding or external authentication is supported. For example, the group corresponding to the GIN 1, the GIN 2, and the GIN 3 in Table 4 includes one or more default credentials servers, and the GIN 1, the GIN 2, and the GIN 3 indicate that onboarding is supported. The group corresponding to the GIN 4 includes one or more default credentials servers, and the GIN 4 is used to support external authentication. In other words, the non-public network corresponding to the non-public network identifier 1 supports onboarding, and the non-public network corresponding to the non-public network identifier 2 may support onboarding or external authentication.

Optionally, the broadcast message may further include a priority order of a service set identifier (SSID) that supports onboarding or external authentication.

S702: The terminal device determines an identifier of a first non-public network from the identifiers of the at least one non-public network based on configuration information.

The configuration information may include at least one of one or more non-public network identifiers that support onboarding and one or more non-public network identifiers that support external authentication.

In a possible case, the configuration information may be preconfigured for the terminal device, and may be implemented with reference to the embodiment shown in FIG. 4. In another possible implementation, the configuration information may be sent by the trusted non-3GPP access network device to the terminal device or sent by a home network of the terminal device to the terminal device. For implementation, refer to the network list in S701.

In S702, if the terminal device performs onboarding or needs to perform onboarding, the terminal device may select, from the identifiers of the at least one non-public network, the non-public network identifier that supports onboarding. If the terminal device performs external authentication or needs to perform external authentication, the terminal device may select, from the identifiers of the at least one non-public network, the non-public network identifier that supports external authentication.

S703: The terminal device sends a registration request message to the trusted non-3GPP access network device.

Correspondingly, the trusted non-3GPP access network device receives the registration request message.

The registration request message may include the identifier of the first non-public network. The identifier of the first non-public network may be the non-public network identifier selected by the terminal device in S702.

S704: The trusted non-3GPP access network device sends the registration request message to a mobility management device.

The mobility management device herein may perform access management on the terminal device. For example, the mobility management device may be an AMF.

For example, the trusted non-3GPP access network device may select, for the terminal device, a mobility management device that supports onboarding or external authentication. For example, the trusted non-3GPP access network device may select the mobility management device based on the identifier of the first non-public network selected by the terminal device in S702. For example, if the terminal device selects, in S702, the identifier of the first non-public network that supports onboarding, the trusted non-3GPP access network device may select, in the first non-public network, the mobility management device that supports onboarding. If the terminal device selects, in S702, the identifier of the first non-public network that supports external authentication, the trusted non-3GPP access network device may select, in the first non-public network, the mobility management device that supports external authentication.

Optionally, the terminal device may send first information to the trusted non-3GPP access network device. The first information may indicate onboarding or external authentication. For example, the first information may indicate that the terminal device performs onboarding, or may indicate that the terminal device needs to perform onboarding. The trusted non-3GPP access network device may select, in the first non-public network, the mobility management device that supports onboarding. For another example, the first information may indicate that external authentication is performed. For example, the first information may indicate that the terminal device performs external authentication, or may indicate that the terminal device needs to perform external authentication. The trusted non-3GPP access network device may select, in the first non-public network, the mobility management device that supports external authentication.

In this way, the terminal device may set up a connection to the trusted non-3GPP access network device. For example, the terminal device sets up a layer 2 connection to the trusted non-3GPP access network device.

Based on the foregoing solution, the terminal device may determine the identifier of the first non-public network through the configuration information and the obtained identifiers of the at least one non-public network. In this way, an authentication manner indicated by the non-public network is an authentication manner performed by the terminal device. Therefore, the identifier of the first non-public network sent by the terminal device to the trusted non-3GPP access network device indicates, to the trusted non-3GPP access network device, the authentication manner supported by the terminal device, so that the trusted non-3GPP access network device located in a non-public network corresponding to the identifier of the first non-public network can select, based on the indication of the terminal device, a proper mobility management device to perform access management on the terminal device.

Figure 7:
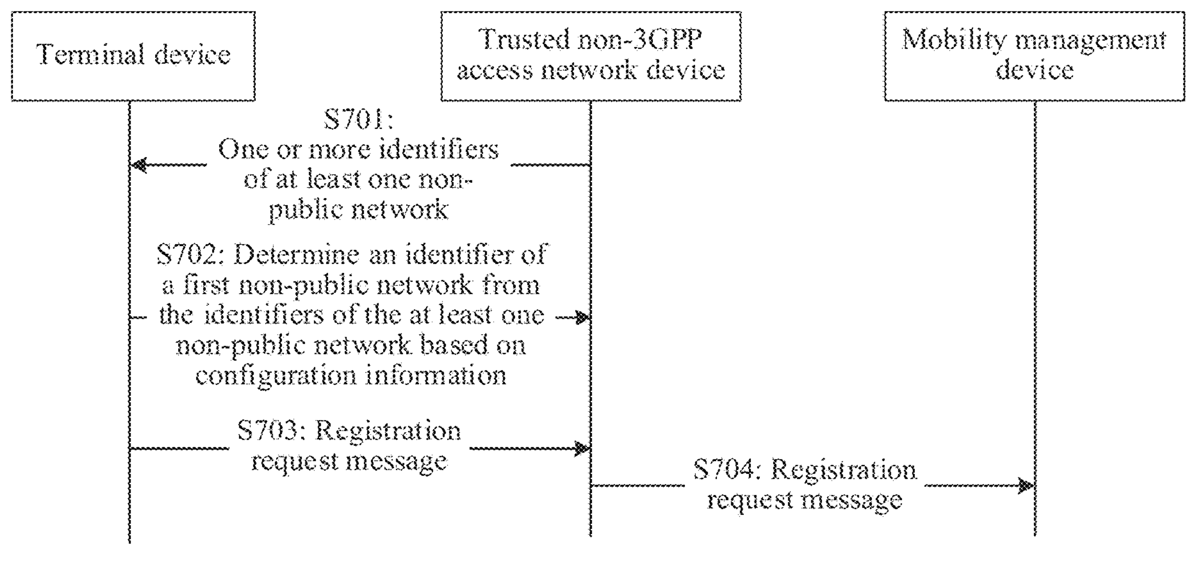
FIG. 7 is an example flowchart of an access network device selection method according to an embodiment of this application.
Figure 8:
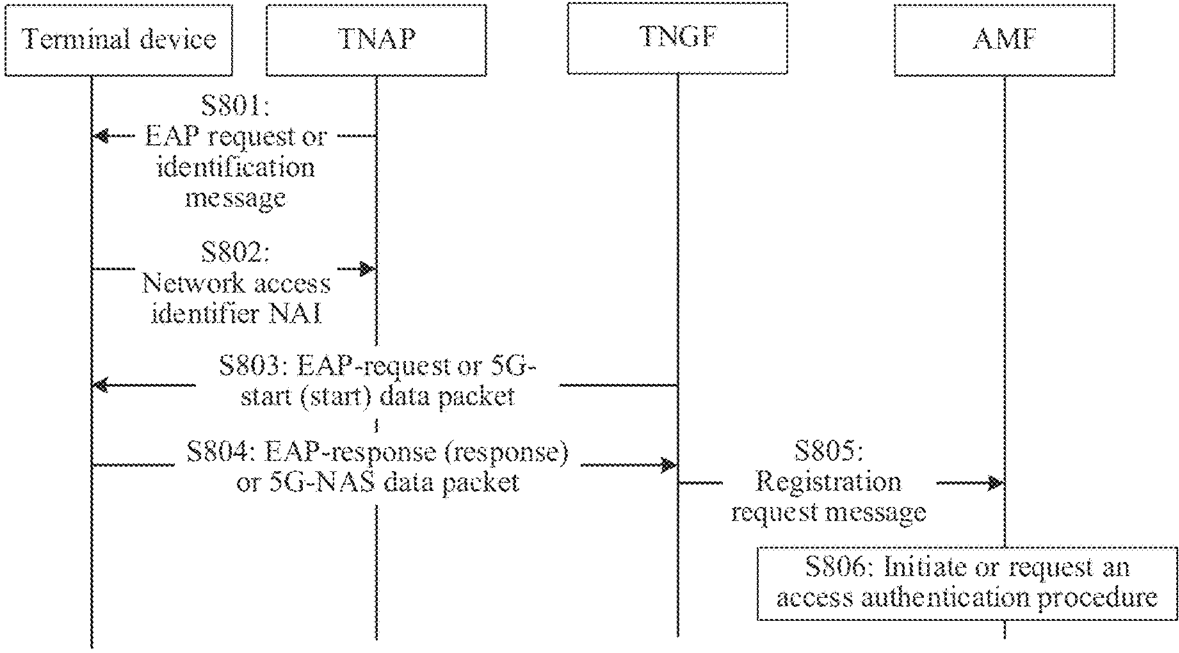
FIG. 8 is an example flowchart of accessing a non-public network by a terminal device according to an embodiment of this application.

In the embodiment shown in FIG. 7, the trusted non-3GPP access network device may include a TNAP and a TNGF. In the embodiment shown in FIG. 7, the TNAP may perform the operations of S701 and S702, and the TNGF may perform the operations of S703 and S704.

The following describes a registration procedure of a terminal device with reference to FIG. 8, and the registration procedure may include the following operations. In FIG. 8, descriptions are provided by using an example in which a non-3GPP access network device includes a TNAP and a TNGF.

S801: The TNAP sends an EAP request or an identification message to a terminal device.

Correspondingly, the terminal device receives the EAP request or the identification message. The message is used to request to obtain identification information of the terminal device.

S802: The terminal device sends a network access identifier (NAI) to the TNAP.

The NAI indicates that a 5G connectivity of a specific PLMN is requested, for example, NAI="<any_username>@nai.5gc.mnc<MNC>.mcc <MCC>.3gppnetwork.org". The NAI triggers the TANP to send an AAA request to the TNGF. An EAP data packet between the TNAP and the TNGF is encapsulated through an AAA message. The AAA request further includes a TNAP identifier, which may be used as user location information (ULI).

S803: The TNGF sends the EAP request or a 5G-start data packet to the terminal device.

The EAP request or the 5G-start data packet notifies the terminal device to initiate an EAP-5G session.

S804: The terminal device sends an EAP-response or a 5G-NAS data packet to the TNGF.

The EAP-response or the 5G-NAS data packet may include an AN parameter and a registration request message. The AN parameter includes parameter information used by the TNGF to select an AMF, for example, a GUAMI or a selected PLMN ID. Optionally, the parameter information for selecting the AMF may further include an NID. It may be understood that, in an SNPN scenario, the PLMN ID and the NID may uniquely identify one SNPN.

Optionally, the terminal device may include first information in the AN parameter. For example, if the terminal device performs onboarding, the first information may indicate onboarding. For another example, if the terminal device performs external authentication, the first information may indicate external authentication.

S805: The TNGF sends the registration request message to the AMF.

For example, the TNGF may select the AMF for the terminal device, and send the registration request message to the selected AMF.

For example, if the AN parameter includes the first information, and the first information indicates onboarding, the TNGF selects, for the terminal device, an AMF that supports onboarding. If the AN parameter includes the first information, and the first information indicates external authentication, the TNGF selects, for the terminal device, an AMF that supports external authentication.

S806: The AMF initiates or requests an access authentication procedure.

For example, when the terminal device indicates to perform onboarding or needs to perform onboarding, the AMF may select a corresponding authentication device to perform authentication on the terminal device. For example, when an AUSF and a UDM device are deployed in a CH indicated by an identifier of the terminal device, the AMF selects the AUSF in the CH to perform authentication on the terminal device. When an AAA server is deployed in the CH indicated by the identifier of the terminal device, the AMF selects a local AUSF (e.g., an AUSF located in a same network as the AMF) to perform authentication on the terminal device or participate in an authentication procedure of the terminal device. After selecting a proper authentication device, the AMF may initiate the authentication procedure, or may request the authentication device to perform authentication on the terminal device.

Figure 9:
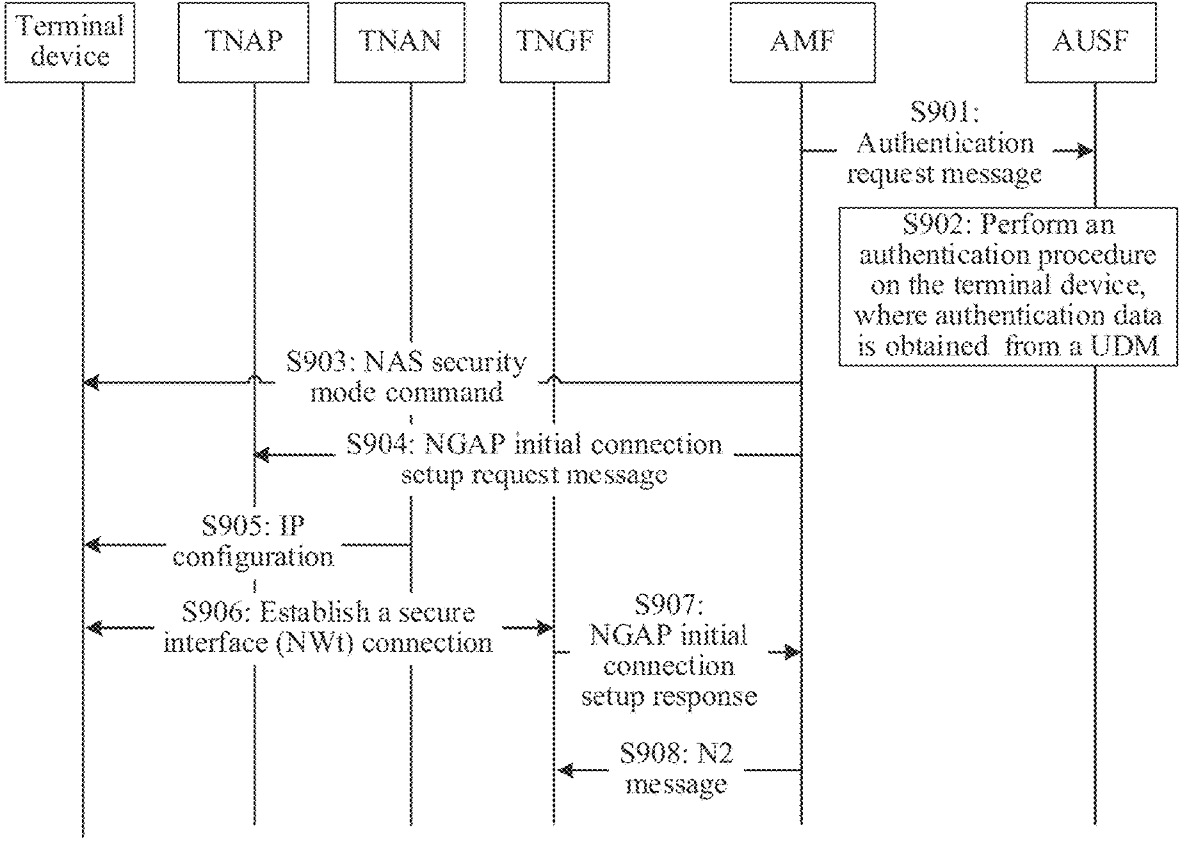
FIG. 9 is an example flowchart of performing authentication on a terminal device according to an embodiment of this application.

The following describes, through FIG. 9, a manner of performing authentication on a terminal device in embodiments of this application. It should be noted that, if the terminal device performs onboarding, an AUSF shown in FIG. 9 may be an AUSF in a DCS domain. If the terminal device performs external authentication, an AUSF shown in FIG. 9 may be an AUSF of a CH. Optionally, if the terminal device performs onboarding and an AAA server is deployed in the DCS domain, it may be considered that the AUSF is an AUSF located in a network in which an AMF is located. In other words, the AUSF located in the network in which the AMF is located may perform a function of the AUSF shown in FIG. 9, and the AAA server in the DCS domain performs authentication on the terminal device. Optionally, if the terminal device performs external authentication and an AAA server is deployed in the CH, an AUSF located in a network in which an AMF is located may be used instead of the AUSF. In other words, the AUSF located in the network in which the AMF is located may perform a function of the AUSF shown in FIG. 9, and the AAA server in the CH performs authentication on the terminal device.

FIG. 9 is an example flowchart of authentication according to an embodiment of this application, including the following operations.

S901: An AMF sends an authentication request message to an AUSF.

Correspondingly, the AUSF receives the authentication request message.

The AMF may select the AUSF, and send the authentication request message to the AUSF.

S902: The AUSF performs an authentication procedure on the terminal device, where authentication data is obtained from a UDM.

All authentication-related data packets are encapsulated through NAS messages. The NAS messages are all encapsulated through an EAP or a 5G-NAS data packet. After the authentication is completed, the AUSF sends a security anchor function (seaf) key to the AMF. The AMF uses this key to derive a NAS security key and a security key of a TNGF.

S903: The AMF sends a NAS security mode command to the terminal device.

The NAS security mode command may be used to activate NAS security. The NAS security mode command may include EAP-success information, which indicates that 3G-WLAN interworking authentication and key assignment protocol (EAP-AKA') authentication performed by a core network succeeds. The N3IWF forwards, to the terminal device, the NAS security mode command sent by the AMF, and sends, to the AMF, a NAS security mode complete message sent by the terminal device.

S904: The AMF sends an NGAP initial context setup request message to the TNGF.

For example, after the AMF receives the NAS security mode complete message from the terminal device, the AMF may send the NGAP initial context setup request to the TNGF. The NAP initial context setup request may include the key of the TNGF.

The TNGF sends an EAP request or a 5G-notification to the terminal device. The EAP request or the 5G-notification may include address information of the TNGF, and the address information is used by the terminal device to set up an IPsec SA with the TNGF.

The UE sends an EAP response or a 5G-notification to the TNGF. After receiving the EAP response or the 5G-notification, the TNGF sends an AAA message to the TNAP. The AAA message may include the EAP success information sent to the terminal device. The TNGF sends a TNAP key derived by the TNGF to the TNAP. The TNGF sends the EAP success information to the terminal device. The TNAP key is used to set up L2 security (e.g., a layer-2 security) between the terminal device and the TNAP.

S905: The terminal device receives IP configuration of a TNAN.

For example, the terminal device obtains an IP address through a dynamic host configuration protocol (DHCP).

S906: The terminal device initiates setup of a secure interface (NWt) connection to the TNGF.

The TNGF assigns an inner IP address, a transmission control protocol (TCP) port, a NAS address, and a differentiated services code point (DSCP) value to the UE.

All IP data packets transmitted between the terminal device and the TNGF need to be marked with the DSCP value. The terminal device and the TNAP may map the DSCP value to a corresponding QoS level. After setting up a signaling IPsec SA, the terminal device sets up a TCP connection to the TNGF by using the NAS address and the TCP port.

Transmission of all subsequent NAS messages is over the signaling IPsec SA. For a NAS message sent by the terminal device to the AMF, a source address is an inner IP address of the UE, and a destination address is the NAS address. For a NAS message sent by the AMF to the terminal device, a source address is the NAS address, and a destination address is the inner IP address of the UE.

S907: The TNGF sends an NGAP initial context setup response to the AMF.

The NGAP initial context setup response message is used to notify the AMF that a UE context has been created.

S908: The AMF sends an N2 message to the TNGF.

The N2 message may include a NAS registration accept message sent to the terminal device. During registration with the UDM, the AMF needs to provide the UDM with an access type being non-3GPP access.

Authentication on the terminal device may be implemented based on S901 to S908. Therefore, the terminal device may register with a non-public network through a trusted non-3GPP access network device.

Figure 10:
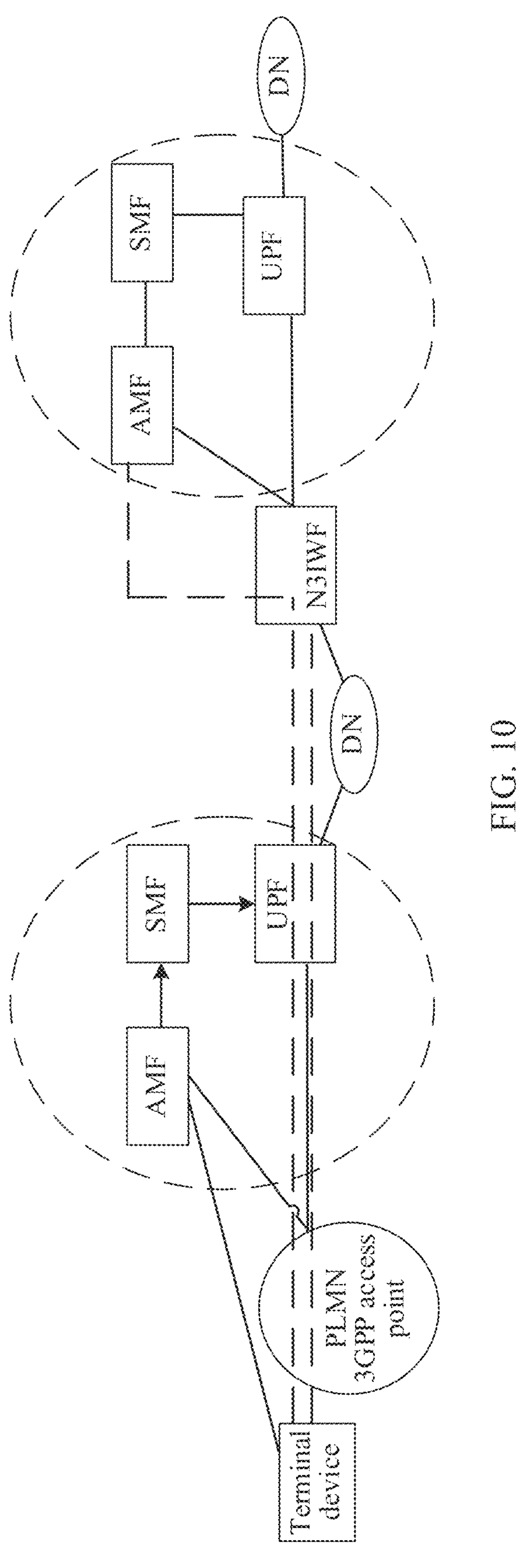
FIG. 10 is a diagram of an interworking architecture between a PLMN and a non-public network according to an embodiment of this application.

Currently, to enable a terminal device that successfully registers with a PLMN to obtain access to a non-public network service, for example, an SNPN service, an interworking architecture between a non-public network and a PLMN shown in FIG. 10 is proposed. A requirement of the interworking architecture between the non-public network and the PLMN is that when the terminal needs to obtain access to both the non-public network service and a PLMN service, and the non-public network and the PLMN do not have co-coverage, or the non-public network and the PLMN have co-coverage but the terminal device does not support a dual-radio frequency mode, the interworking architecture may be used to enable the terminal device to obtain access to both the non-public network service and the PLMN service. In this case, the terminal device needs to hold subscriptions of the PLMN and the non-public network and support maintenance of two independent registration states, which are respectively used to access the non-public network and access the PLMN. According to the interworking architecture shown in FIG. 10, the terminal device first registers with the PLMN by using the subscription of the PLMN, and sets up a user plane connection. Then, the terminal device may set up a connection to an N3IWF in the non-public network by using the subscription or a credential of the non-public network and through the user plane connection in the PLMN. The terminal device initiates a registration procedure and a session setup procedure to the non-public network through the N3IWF in the non-public network, to obtain access to the non-public network service. Therefore, for the non-public network, the terminal device accesses the non-public network by using a non-3GPP access technology, and the PLMN may be considered as a non-3GPP access network to which the terminal device is connected.

A position where the terminal device is located when the terminal device sets up a connection to the N3IWF in the non-public network through the interworking architecture between the PLMN and the non-public network is different from a position where the terminal device is located when the terminal device in coverage of the non-public network accesses the non-public network through Wi-Fi. In the former scenario, the terminal device is outside the coverage of the non-public network, and in the latter scenario, the terminal device is within the coverage of the non-public network. If data transmission of some services in the non-public network is not allowed to go out of the coverage of the non-public network, the terminal device in the former scenario cannot obtain access to the service, and the terminal device in the latter scenario is allowed to obtain access to the service. Therefore, some mechanisms are required to enable the non-public network to identify whether the terminal device is connected to the N3IWF in the non-public network through the PLMN or the terminal device is directly connected to the N3IWF through the N3GPP access technology of the non-public network, to perform differentiated data transmission for the terminal device.

Figure 11:
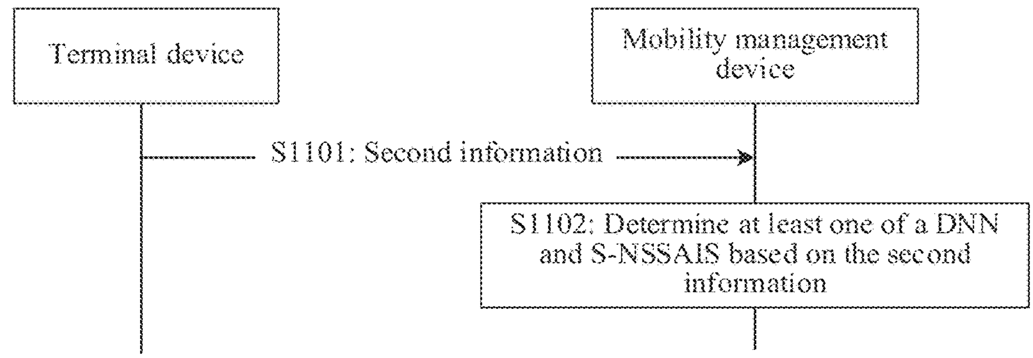
FIG. 11 is an example flowchart of an access network device selection method according to an embodiment of this application.

In view of this, embodiments of this application provide an access network device selection method. FIG. 11 is an example flowchart of an access network device selection method according to an embodiment of this application. The method may include the following operations.

S101: A terminal device sends second information to a mobility management device.

Correspondingly, the mobility management device receives the second information from the terminal device.

The mobility management device is located in a non-public network. The second information may indicate an access technology type of the terminal device. The access technology type may include non-3GPP access or PLMN access. Non-3GPP access may be understood as that the terminal device accesses the non-public network through a non-3GPP access network, and PLMN access may be understood as that the terminal device accesses the non-public network through a PLMN.

S1102: The mobility management device determines at least one of data network name information and network slice information based on the access technology type.

For example, the mobility management device may determine, based on the access technology type, data network name (DNN) information of a data network available for the terminal device to connect. For another example, the mobility management device may determine, based on the access technology type, a network slice available for the terminal device. The network slice information may include, for example, network slice selection assistance information (NSSAI) and single network slice selection assistance information (S-NSSAI).

For example, when the second information indicates that the access technology type is non-3GPP access, the mobility management device may select or determine a data network for the terminal device from data networks corresponding to the access technology type of non-3GPP access, or select S-NSSAIS for the terminal device from network slices corresponding to the access technology type of non-3GPP access.

For another example, when the second information indicates that the access technology type is PLMN access, the mobility management device may select or determine a data network for the terminal device from data networks corresponding to the access technology type of PLMN access, or select a network slice for the terminal device from network slices corresponding to the access technology type of PLMN access.

Based on S1101 and S1102, the terminal device may obtain access to a non-public network service through at least one of the network slice information and the data network name information that are determined by the mobility management device. Because the network slice information and the data network name information are selected by the mobility management device based on the access technology type of the terminal device, different network slice information and different data network name information may be selected or determined based on the access technology type of the terminal device. Therefore, differentiated management or data transmission can be implemented for the terminal device.

In a possible implementation, the terminal device may send third information to the mobility management device. The third information indicates onboarding or indicates that the terminal device accesses the non-public network for the purpose of performing onboarding. When the second information indicates that the access technology type of the terminal device is PLMN access, in other words, when the terminal device accesses the non-public network through the PLMN, the mobility management device may reject access of the terminal device.

Figure 5:
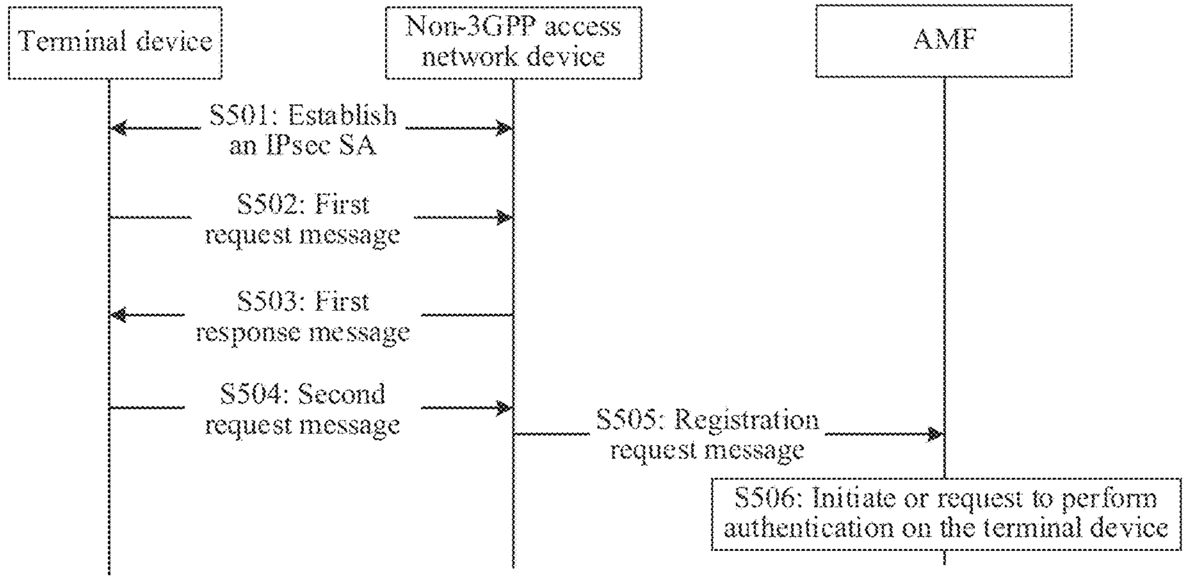
FIG. 5 is an example flowchart of accessing a non-public network by a terminal device according to an embodiment of this application.
Figure 12:
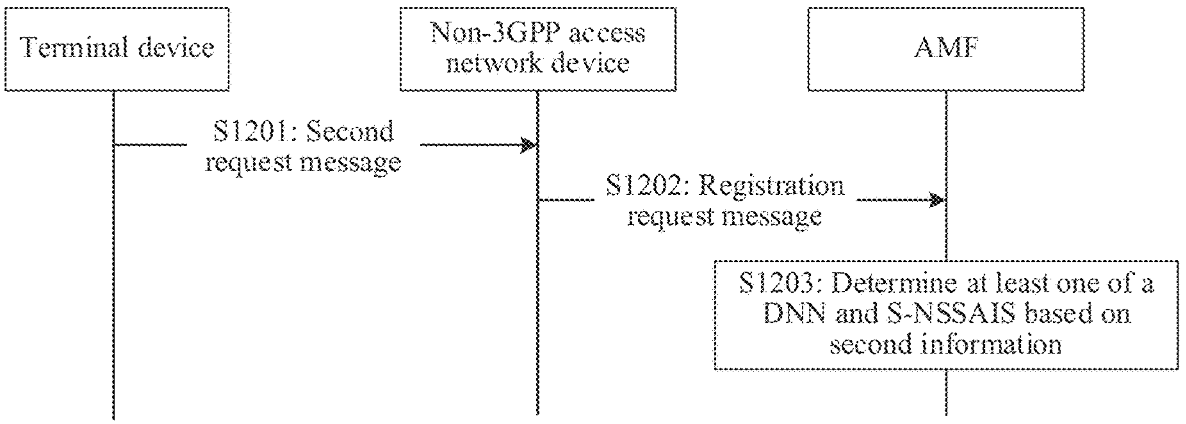
FIG. 12 is an example flowchart of an access network device selection method according to an embodiment of this application.

In an example, the embodiment shown in FIG. 11 may be applied to the AMF shown in FIG. 5. The following provides descriptions through FIG. 12.

S1201: The terminal device sends a second request message to the non-3GPP access network device.

Correspondingly, the non-3GPP access network device receives the second request message.

S1201 may be implemented with reference to S504.

The second request message may include an EAP response or a 5G-NAS data packet.

The 5G-NAS data packet may include an AN parameter and a registration request message. The AN parameter includes parameter information used by the non-3GPP access network device to select an AMF, for example, a GUAMI or a selected PLMN ID. Optionally, the parameter information for selecting the AMF may further include an NID.

The AN parameter may further include second information. For the second information, refer to S1101 of FIG. 11.

S1202: The non-3GPP access network device sends the registration request message to the AMF.

For example, the non-3GPP access network device may select the AMF for the terminal device, and send the registration request message to the selected AMF.

If the AN parameter includes the second information, an N3IWF needs to send the second information to the AMF. In other words, an access technology type of the terminal device is used by the AMF to determine whether the terminal device accesses a non-public network through a PLMN or is within coverage of a non-public network, and accesses the non-public network through the non-3GPP access network device.

S1203: The AMF determines at least one of a DNN and S-NSSAIS based on the second information.

S1203 may be implemented with reference to S1102.

For example, when the second information indicates that the access technology type is non-3GPP access, the AMF may select or determine the DNN for the terminal device from DNNs corresponding to the access technology type of non-3GPP access, or select or determine the S-NSSAIS for the terminal device from S-NSSAIS corresponding to the access technology type of non-3GPP access. The S-NSSAIS may be an implementation of network slice information.

For another example, when the second information indicates that the access technology type is PLMN access, the AMF may select or determine the DNN for the terminal device from DNNs corresponding to the access technology type of PLMN access, or select or determine the S-NSSAIS for the terminal device from S-NSSAIS corresponding to the access technology type of PLMN access.

Optionally, the registration request message in S1202 may further include third information. When the third information indicates onboarding, and the second information in S1202 indicates that the access technology type is PLMN access, the AMF may reject access of the terminal device. For example, the AMF may send a registration reject message to the terminal device.

Figure 13:
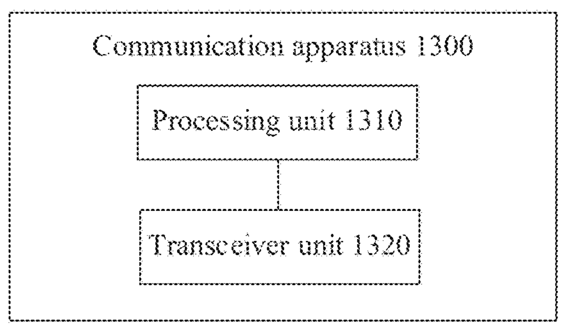
FIG. 13 is a diagram of a communication apparatus according to an embodiment of this application.
Figure 14:
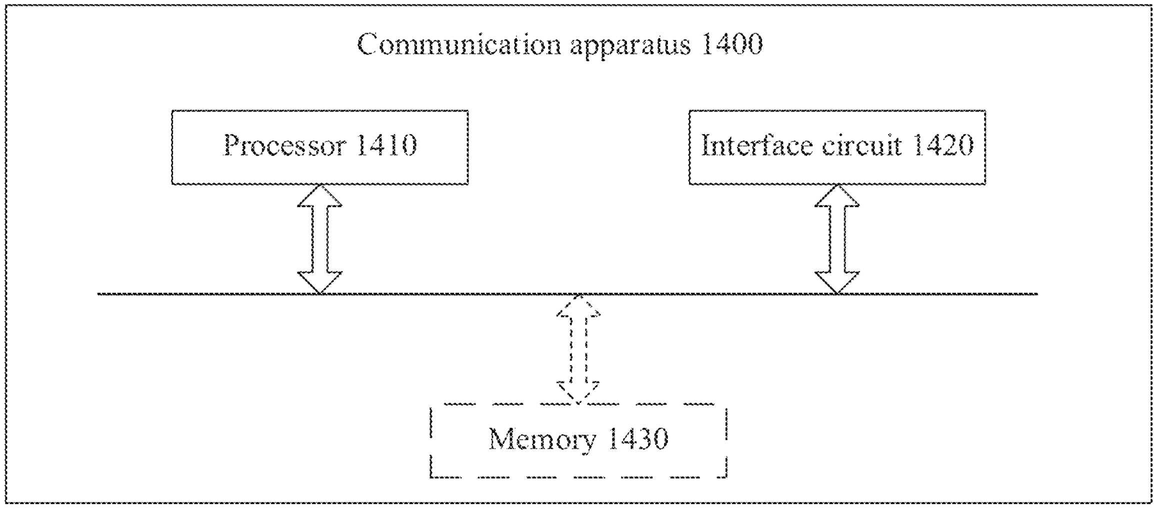
FIG. 14 is a diagram of a communication apparatus according to an embodiment of this application.

Based on a same concept as the foregoing embodiments, embodiments of this application provide a communication apparatus. FIG. 13 and FIG. 14 each are a diagram of a structure of a possible communication apparatus according to an embodiment of this application. These communication apparatuses may be configured to implement functions of the terminal device, the DNS, the non-3GPP access network device, the trusted non-3GPP access network device, or the mobility management device in the foregoing method embodiments, and therefore can also implement beneficial effects of the foregoing method embodiments. In embodiments of this application, the communication apparatus may be a terminal device, a DNS, a non-3GPP access network device, a trusted non-3GPP access network device, or a mobility management device, or may be a module (for example, a chip) used in a terminal device, a DNS, a non-3GPP access network device, a trusted non-3GPP access network device, or a mobility management device.

As shown in FIG. 13, the communication apparatus 1300 includes a processing unit 1310 and a transceiver unit 1320. The communication apparatus 1300 is configured to implement functions of the terminal device, the non-3GPP access network device, the trusted non-3GPP access network device, or the mobility management device in the method embodiments shown in FIG. 3 to FIG. 12.

When the communication apparatus 1300 is configured to implement the functions of the terminal device, the processing unit 1310 is configured to generate a query message. The query message includes one or more of the following: first indication information, second indication information, and at least one GIN. The first indication information indicates onboarding, and the second indication information indicates external authentication. The at least one GIN is an identifier of a group to which one or more default credentials servers or credentials holders belong. The query message is used to request to obtain a non-3GPP access network device identifier, and a non-3GPP access network device corresponding to the non-3GPP access network device identifier is located in a first non-public network. The transceiver unit 1320 is configured to send the query message to a DNS, and receive a query response from the DNS. The query response includes the non-3GPP access network device identifier.

In a design, the query message further includes a non-public network identifier, and the first non-public network is a non-public network corresponding to the non-public network identifier.

In a design, the query message further includes domain name information, and one or more of the first indication information, the second indication information, and the at least one GIN are included in the domain name information.

In a design, when the query message includes the at least one GIN, the first non-public network supports connecting to a default credentials server or a credentials holder corresponding to the at least one GIN to perform onboarding, or the first non-public network supports connecting to a default credentials server or a credentials holder corresponding to the at least one GIN to perform external authentication.

In a design, the non-3GPP access network device supports onboarding or external authentication.

In a design, the transceiver unit 1320 is further configured to send first information to the non-3GPP access network device, where the first information indicates onboarding or external authentication.

In a design, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

When the communication apparatus 1300 is configured to implement a function of the DNS, the transceiver unit 1320 is configured to receive a query message from the terminal device, where the query message includes one or more of the following: first indication information, second indication information, and at least one GIN. The first indication information indicates onboarding, and the second indication information indicates external authentication. The at least one GIN is an identifier of a group to which one or more default credentials servers or credentials holders belong. The query message is used to request to obtain a non-3GPP access network device identifier, and a non-3GPP access network device corresponding to the non-3GPP access network device identifier is located in a first non-public network. The processing unit 1310 is configured to determine the non-3GPP access network device identifier based on the query message. The transceiver unit 1320 is further configured to send a query response to the terminal device, where the query response includes the non-3GPP access network device identifier.

In a design, the query message further includes a non-public network identifier, and the first non-public network is a non-public network corresponding to the non-public network identifier.

In a design, the query message further includes domain name information, and one or more of the first indication information, the second indication information, and the at least one GIN are included in the domain name information.

In a design, when the query message includes the at least one GIN, the first non-public network supports connecting to a default credentials server or a credentials holder corresponding to the at least one GIN to perform onboarding, or the first non-public network supports connecting to a default credentials server or a credentials holder corresponding to the at least one GIN to perform external authentication.

In a design, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

When the communication apparatus 1300 is configured to implement the function of the terminal device, the processing unit 1310 is configured to determine the non-public network identifier based on configuration information. The configuration information indicates a non-public network that supports onboarding or a non-public network that supports external authentication. The transceiver unit 1320 is configured to send the query message to the DNS, where the query message includes the non-public network identifier. The transceiver unit 1320 is further configured to receive the query response from the DNS, where the query response includes the non-3GPP access network device identifier. A non-3GPP access network device corresponding to the non-3GPP access network device identifier is located in a non-public network corresponding to the non-public network identifier.

In a design, the configuration information indicates that all non-3GPP access network devices in the non-public network that supports onboarding support onboarding, and/or the configuration information indicates that all non-3GPP access network devices in the non-public network that supports external authentication support external authentication.

In a design, the transceiver unit 1320 is further configured to send the first information to the non-3GPP access network device, where the first information indicates onboarding or external authentication.

In a design, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

When the communication apparatus 1300 is configured to implement the function of the non-3GPP access network device, the transceiver unit 1320 is configured to receive first information from the terminal device, where the first information indicates onboarding or external authentication. The processing unit 1310 is configured to select, based on the first information, a mobility management device that supports onboarding or external authentication.

In a design, the non-3GPP access network device is an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

When the communication apparatus 1300 is configured to implement the function of the terminal device, the transceiver unit 1320 is configured to obtain one or more identifiers of at least one non-public network. The processing unit 1310 is configured to determine an identifier of the first non-public network from the identifiers of the at least one non-public network based on configuration information. The configuration information indicates a non-public network that supports onboarding or a non-public network that supports external authentication. The transceiver unit 1320 is further configured to set up a connection to the trusted non-3GPP access network device, where the trusted non-3GPP access network device is located in the first non-public network.

In a design, the transceiver unit 1320 is further configured to receive one or more of first indication information, second indication information, and at least one GIN. The first indication information indicates that the at least one non-public network supports onboarding. The second indication information indicates that the at least one non-public network supports external authentication. The at least one GIN is an identifier of a group to which one or more default credentials servers or credentials holders belong.

In a design, the transceiver unit 1320 is specifically configured to obtain the one or more identifiers of the at least one non-public network from a broadcast message.

When the communication apparatus 1300 is configured to implement the function of the trusted non-3GPP access network device, the transceiver unit 1320 is configured to send one or more identifiers of at least one non-public network, and set up a connection to the terminal device. The transceiver unit 1320 is further configured to receive a registration request message from the terminal device. The registration request message includes the identifier of the first non-public network, and the identifier of the first non-public network is one of the identifiers of the at least one non-public network. The processing unit 1310 is configured to determine a mobility management device based on the identifier of the first non-public network. The mobility management device is configured to perform access management on the terminal device. The transceiver unit 1320 is further configured to send the registration request message to the mobility management device.

In a design, the transceiver unit 1320 is further configured to receive first information from the terminal device, where the first information indicates onboarding or external authentication. The processing unit 1310 is specifically configured to select a mobility management device that supports onboarding or external authentication. The transceiver unit 1320 is further configured to send the registration request message to the mobility management device.

In a design, the transceiver unit 1320 is further configured to send one or more of first indication information, second indication information, and at least one GIN. The first indication information indicates that the at least one non-public network supports onboarding. The second indication information indicates that the at least one non-public network supports external authentication. The at least one GIN is an identifier of a group to which one or more default credentials servers or credentials holders belong.

In a design, the transceiver unit 1320 is specifically configured to send a broadcast message, where the broadcast message includes the one or more identifiers of the at least one non-public network.

In a design, the first indication information or the second indication information is a name of a network list.

In a design, the first indication information is a name of a first network list, and the second indication information is a name of a second network list. The first network list includes an identifier of at least one second non-public network, and the at least one second non-public network supports onboarding. The second network list includes an identifier of at least one third non-public network, the at least one third non-public network supports external authentication, and the identifiers of the at least one non-public network include the identifier of the at least one second non-public network and/or the identifier of the at least one third non-public network.

When the communication apparatus 1300 is configured to implement the function of the mobility management device, the transceiver unit 1320 is configured to receive second information from the terminal device, where the second information indicates an access technology type of the terminal device, and the mobility management device is located in a non-public network. The processing unit 1310 is configured to determine at least one of data network name information and network slice information based on the access technology type, where a network slice corresponding to the network slice information is a network slice available for the terminal device to use, and a data network corresponding to the data network name information is a data network available for the terminal device to connect.

In a design, the transceiver unit 1320 is further configured to receive third information from the terminal device, where the third information indicates onboarding. The processing unit 1310 is further configured to reject access of the terminal device when the access technology type indicates that the terminal device accesses the non-public network through a public network.

For more detailed descriptions of the processing unit 1310 and the transceiver unit 1320, directly refer to related descriptions in the method embodiments shown in FIG. 3 to FIG. 12. Details are not described herein again.

As shown in FIG. 14, the communication apparatus 1400 includes a processor 1410 and an interface circuit 1420. The processor 1410 and the interface circuit 1420 are coupled to each other. It may be understood that, the interface circuit 1420 may be a transceiver or an input/output interface. Optionally, the communication apparatus 1400 may further include a memory 1430, configured to: store instructions to be executed by the processor 1410, store input data required for running instructions by the processor 1410, or store data generated after the processor 1410 runs instructions.

When the communication apparatus 1400 is configured to implement the method shown in FIG. 3 to FIG. 12, the processor 1410 is configured to implement a function of the processing unit 1310, and the interface circuit 1420 is configured to implement a function of the transceiver unit 1320.

Specifically, when the communication apparatus 1400 is configured to implement a function of the terminal device, the processor 1410 is configured to generate a query message. The query message includes one or more of the following: first indication information, second indication information, and at least one GIN. The first indication information indicates onboarding, and the second indication information indicates external authentication. The at least one GIN is an identifier of a group to which one or more default credentials servers or credentials holders belong. The query message is used to request to obtain a non-3GPP access network device identifier, and a non-3GPP access network device corresponding to the non-3GPP access network device identifier is located in a first non-public network. The interface circuit 1420 is configured to output the query message to a DNS, and input a query response from the DNS. The query response includes the non-3GPP access network device identifier.

When the communication apparatus 1400 is configured to implement a function of the DNS, the interface circuit 1420 is configured to input a query message from the terminal device, where the query message includes one or more of the following: first indication information, second indication information, and at least one GIN. The first indication information indicates onboarding, and the second indication information indicates external authentication. The at least one GIN is an identifier of a group to which one or more default credentials servers or credentials holders belong. The query message is used to request to obtain a non-3GPP access network device identifier, and a non-3GPP access network device corresponding to the non-3GPP access network device identifier is located in a first non-public network. The processor 1410 is configured to determine the non-3GPP access network device identifier based on the query message. The interface circuit 1420 is further configured to output the query response to the terminal device, where the query response includes the non-3GPP access network device identifier.

When the communication apparatus 1400 is configured to implement a function of the non-3GPP access network device, the interface circuit 1420 is configured to input first information from the terminal device, where the first information indicates onboarding or external authentication. The processor 1410 is configured to select, based on the first information, a mobility management device that supports onboarding or external authentication.

When the communication apparatus 1400 is configured to implement a function of the terminal device, the processor 1410 is configured to determine the non-public network identifier based on configuration information. The configuration information indicates a non-public network that supports onboarding or a non-public network that supports external authentication. The interface circuit 1420 is configured to output the query message to the DNS, where the query message includes the non-public network identifier. The interface circuit 1420 is further configured to input the query response from the DNS, where the query response includes the non-3GPP access network device identifier. A non-3GPP access network device corresponding to the non-3GPP access network device identifier is located in a non-public network corresponding to the non-public network identifier.

When the communication apparatus 1400 is configured to implement a function of the terminal device, the interface circuit 1420 is configured to input one or more identifiers of at least one non-public network. The processor 1410 is configured to determine an identifier of the first non-public network from the identifiers of the at least one non-public network based on configuration information. The configuration information indicates a non-public network that supports onboarding or a non-public network that supports external authentication. The interface circuit 1420 is further configured to set up a connection to a trusted non-3GPP access network device, where the trusted non-3GPP access network device is located in the first non-public network.

When the communication apparatus 1400 is configured to implement a function of the trusted non-3GPP access network device, the interface circuit 1420 is configured to output one or more identifiers of at least one non-public network, and set up a connection to the terminal device. The interface circuit 1420 is further configured to input a registration request message from the terminal device. The registration request message includes the identifier of the first non-public network, and the identifier of the first non-public network is one of the identifiers of the at least one non-public network. The processor 1410 is configured to determine a mobility management device based on the identifier of the first non-public network. The mobility management device is configured to perform access management on the terminal device. The interface circuit 1420 is further configured to output the registration request message to the mobility management device.

When the communication apparatus 1400 is configured to implement a function of the mobility management device, the interface circuit 1420 is configured to input second information from the terminal device, where the second information indicates an access technology type of the terminal device, and the mobility management device is located in a non-public network. The processor 1410 is configured to determine at least one of data network name information and network slice information based on the access technology type, where a network slice corresponding to the network slice information is a network slice available for the terminal device to use, and a data network corresponding to the data network name information is a data network available for the terminal device to connect.

For more detailed descriptions of the processor 1410 and the interface circuit 1420, directly refer to related descriptions in the method embodiments shown in FIG. 3 to FIG. 12. Details are not described herein again.

Embodiments of this application further provide a communication system, including a terminal device and a DNS. Optionally, the communication system further includes a non-3GPP access network device. Optionally, the communication system further includes a mobility management device.

Embodiments of this application further provide a communication system, including a terminal device and a trusted non-3GPP access network device. Optionally, the communication system further includes a mobility management device.

Embodiments of this application further provide a communication system, including a terminal device and a mobility management device.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor.

A person of ordinary skill in the art may understand that, various numbers such as first and second in this application are merely used for differentiation for ease of descriptions, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. At least two means two or more. "At least one" or a similar expression thereof means any combination of the items, including any combination of one item (piece) or a plurality of items (pieces). For example, at least one of a, b, or c may indicate: a, b, c, a and b, a and c, b and c, or a, b, and c, where a, b, and c may be singular or plural. "A plurality of" means two or more, and another quantifier is similar to this.

It should be understood that, sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireline (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium in any other form in the art. For example, the storage medium may connect to a processor so that the processor may read information from the storage medium and write information to the storage medium. Optionally, the storage medium may be integrated into a processor. The processor and the storage media may be disposed in an ASIC.

In one or more example designs, the functions described in this application may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communication medium that enables a computer program to move from one place to another. The storage media may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc (disc) include a compact disc, a laser disc, an optical disc, a digital versatile disc (DVD), a floppy disk, and a Blu-ray disc. The disc usually copies data in a magnetic manner, and the disk usually copies data optically in a laser manner. The foregoing combination may also be included in the computer-readable medium.

What is claimed is:

1. A method, comprising:

sending, by a terminal device, a query message to a domain name server (DNS), wherein the query message comprises one or more of: first indication information, second indication information, or at least one group identifier for network selection (GIN), wherein the first indication information indicates onboarding, and the second indication information indicates external authentication, and the at least one GIN comprises an identifier of a group to which one or more default credentials servers or credentials holders belong, and wherein the query message requests to obtain a non-3$^{rd}$ generation partnership project (3GPP) access network device identifier, and a non-3GPP access network device corresponding to the non-3GPP access network device identifier is located in a first non-public network; and receiving, by the terminal device, a query response from the DNS, wherein the query response comprises the non-3GPP access network device identifier identifying the non-3GPP access network device.

2. The method according to claim 1, wherein the query message further comprises a non-public network identifier, and the first non-public network comprises a non-public network corresponding to the non-public network identifier.

3. The method according to claim 1, wherein the query message further comprises domain name information and the first indication information.

4. The method according to claim 1, wherein the query message further comprises domain name information and the second indication information.

5. The method according to claim 1, wherein the query message further comprises domain name information, and the at least one GIN is comprised in the domain name information.

6. The method according to claim 1, wherein when the query message comprises the at least one GIN, the first non-public network supports connecting to a default credentials server or a credentials holder corresponding to the at least one GIN to perform onboarding, or the first non-public network supports connecting to the default credentials server or the credentials holder corresponding to the at least one GIN to perform external authentication.

7. The method according to claim 1, wherein the non-3GPP access network device supports onboarding or external authentication.

8. The method according to claim 1, further comprising:

sending, by the terminal device, first information to the non-3GPP access network device, wherein the first information indicates onboarding or external authentication.

9. The method according to claim 1, wherein the non-3GPP access network device comprises an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

10. A method, comprising:

receiving, by a domain name server (DNS), a query message from a terminal device, wherein the query message comprises one or more of: first indication information, second indication information, and at least one group identifier for network selection (GIN), wherein the first indication information indicates onboarding, and the second indication information indicates external authentication, and the at least one GIN comprises an identifier of a group to which one or more default credentials servers or credentials holders belong, and wherein the query message requests to obtain a non-3$^{rd}$ generation partnership project (3GPP) access network device identifier, and a non-3GPP access network device corresponding to the non-3GPP access network device identifier is located in a first non-public network; and sending, by the DNS, a query response to the terminal device, wherein the query response comprises the non-3GPP access network device identifier identifying the non-3GPP access network device, and the non-3GPP access network device identifier is determined based on the query message.

11. The method according to claim 10, wherein the query message further comprises a non-public network identifier, and the first non-public network comprises a non-public network corresponding to the non-public network identifier.

12. The method according to claim 10, wherein the query message further comprises domain name information, and one or more of the first indication information, the second indication information, and the at least one GIN are comprised in the domain name information.

13. The method according to claim 10, wherein when the query message comprises the at least one GIN, the first non-public network supports connecting to a default credentials server or a credentials holder corresponding to the at least one GIN to perform onboarding, or the first non-public network supports connecting to the default credentials server or the credentials holder corresponding to the at least one GIN to perform external authentication.

14. The method according to claim 10, wherein the non-3GPP access network device comprises an untrusted non-3GPP access network device, a non-3GPP interworking function, a trusted non-3GPP access network device, a trusted non-3GPP access point, a trusted non-3GPP gateway function, a trusted wireless local area network interworking function, a wireline access gateway function, or a trusted non-3GPP access network.

15. A method, comprising:

obtaining, by a terminal device, one or more identifiers of at least one non-public network;

determining, by the terminal device, an identifier of a first non-public network from the identifiers of the at least one non-public network based on configuration information, wherein the configuration information indicates a non-public network that supports onboarding or a non-public network that supports external authentication; and setting up, by the terminal device, a connection to a trusted non-3$^{rd}$ generation partnership project (3GPP) access network device based on a message the terminal device receives from a domain name server (DNS), wherein the trusted non-3GPP access network device is located in the first non-public network, and the message comprises a non-3GPP access network device identifier identifying the trusted non-3GPP access network device.

16. The method according to claim 15, further comprising:

receiving, by the terminal device, one or more of first indication information, second indication information, or at least one group identifier for network selection (GIN), wherein the first indication information indicates that the at least one non-public network supports onboarding, the second indication information indicates that the at least one non-public network supports external authentication, and the at least one GIN comprises an identifier of a group to which one or more default credentials servers or credentials holders belong.

17. The method according to claim 15, wherein receiving, by the terminal device, the one or more identifiers of the at least one non-public network comprises:

obtaining, by the terminal device, the one or more identifiers of the at least one non-public network from a broadcast message.

18. A communication apparatus, comprising:

at least one transmitter; and one or more processors, configured to execute computer instructions stored in at least one memory, to enable the communication apparatus to, using the at least one transmitter:

send a query message to a domain name server (DNS), wherein the query message comprises one or more of: first indication information, second indication information, and at least one group identifier for network selection (GIN), the first indication information indicates onboarding, and the second indication information indicates external authentication, and the at least one GIN comprises an identifier of a group to which one or more default credentials servers or credentials holders belong, wherein the query message requests to obtain a non-3$^{rd}$ generation partnership project (3GPP) access network device identifier, and a non-3GPP access network device corresponding to the non-3GPP access network device identifier is located in a first non-public network; and receive a query response from the DNS, wherein the query response comprises the non-3GPP access network device identifier identifying the non-3GPP access network device.

19. The communication apparatus according to claim 18, wherein the query message further comprises a non-public network identifier, and the first non-public network comprises a non-public network corresponding to the non-public network identifier.

20. The communication apparatus according to claim 18, wherein the communication apparatus is further enabled to:

send first information to the non-3GPP access network device, wherein the first information indicates onboarding or external authentication.

* * * * *